US012685346B2

(12) United States Patent
Montalta

(10) Patent No.: US 12,685,346 B2
(45) Date of Patent: Jul. 21, 2026

(54) ADHESIVE GARMENT

(71) Applicant: Wear Nood Trading DWC-LLC, Dubai (AE)

(72) Inventor: Astrid Montalta, Dubai (AE)

(73) Assignee: Wear Nood Trading DWC-LLC, Dubai (AE)

( * ) Notice: Subject to any disclaimer, the term of this patent is extended or adjusted under 35 U.S.C. 154(b) by 0 days.

(21) Appl. No.: 19/094,151

(22) Filed: Mar. 28, 2025

(65) Prior Publication Data

US 2025/0366543 A1 Dec. 4, 2025

Related U.S. Application Data

(60) Provisional application No. 63/652,974, filed on May 29, 2024.

(51) Int. Cl.
A41C 3/06 (2006.01)
C09J 7/38 (2018.01)

(52) U.S. Cl.
CPC .................. A41C 3/065 (2013.01); C09J 7/38 (2018.01); *C09J 2203/358* (2020.08); *C09J 2301/204* (2020.08)

(58) Field of Classification Search
CPC ...................................... A41C 3/065
See application file for complete search history.

(56) References Cited

U.S. PATENT DOCUMENTS

| | | | | |
|---|---|---|---|---|
| 3,254,653 A | * | 6/1966 | Krieger | A41C 3/00 |
| | | | | 450/39 |
| 6,231,424 B1 | * | 5/2001 | Valentin | A41C 3/065 |
| | | | | 450/88 |

| | | | | |
|---|---|---|---|---|
| 6,780,081 B2 | * | 8/2004 | Chen | A41C 3/065 |
| | | | | 450/54 |
| 6,852,001 B2 | * | 2/2005 | Chen | A41C 3/065 |
| | | | | 450/57 |
| 7,290,290 B2 | * | 11/2007 | Treadway Fancher | |
| | | | | A61B 46/27 |
| | | | | 2/16 |
| 10,314,791 B2 | | 6/2019 | Ogino et al. | |
| 10,709,613 B1 | * | 7/2020 | Patton | A61F 13/043 |
| 11,425,940 B2 | * | 8/2022 | Kokenge | A41C 3/065 |
| 11,617,693 B2 | * | 4/2023 | Adams | A61F 13/041 |
| | | | | 602/3 |
| 11,779,061 B1 | * | 10/2023 | Burns | A41C 3/065 |
| | | | | 450/81 |

(Continued)

FOREIGN PATENT DOCUMENTS

KR 200446876 Y1 12/2009

OTHER PUBLICATIONS

Informa Markets—Engineering, "Medical Device Application Considerations for Silicone Adhesives-3M Medical Tapes and Adhesives," Aug. 8, 2013, Retrieved from the Internet: URL: https://www.youtube.com/watch?v=pNIwsui4U6U [retrieved on Jan. 31, 2025].

(Continued)

*Primary Examiner* — Gloria M Hale
(74) *Attorney, Agent, or Firm* — Bookoff McAndrews, PLLC

(57) ABSTRACT

Embodiments of the disclosure are drawn to an adhesive garment for application to a skin surface of a user. The adhesive garment comprises a stretchable material including an anterior surface and a posterior surface, an adhesive, wherein the adhesive is formed of a silicone or a thermoplastic elastomer (TPE), and wherein the adhesive is applied to a portion of the posterior surface of the stretchable material, and a liner, wherein the liner is attached to a portion of a surface of the adhesive opposite from the stretchable material.

20 Claims, 8 Drawing Sheets

(56) References Cited

U.S. PATENT DOCUMENTS

| | | | |
|---|---|---|---|
| 2004/0215118 A1* | 10/2004 | Dumas | A61F 15/004 |
| | | | 602/3 |
| 2006/0166603 A1 | 7/2006 | Chen | |
| 2009/0149114 A1* | 6/2009 | Horton | A41C 3/065 |
| | | | 450/81 |
| 2009/0298386 A1* | 12/2009 | Deal | A41C 3/065 |
| | | | 450/92 |
| 2012/0208434 A1 | 8/2012 | Chang | |
| 2020/0060356 A1* | 2/2020 | Trangmar | A41C 5/005 |
| 2020/0205486 A1 | 7/2020 | O'Leary | |

OTHER PUBLICATIONS

3M Canada, "Selecting the Right Medical Adhesive," May 20, 2016, Retrieved from the Internet: URL: https://www.youtube.com/watch?v=NRwlqJ150dQ [retrieved on Jan. 31, 2025].

3M UK & Ireland, "New Silicone Pressure Sensitive Adhesive Tapes," Oct. 1, 2012, Retrieved from the Internet: URL: https://www.youtube.com/watch?v=8G5rmXlc-kM [retrieved on Jan. 31, 2025].

Liu et al., "Silicone-based adhesives for long-term skin application: cleaning protocols and their effect on peel strength," Biomedical Physics & Engineering Express, 2018, vol. 4: 015004, Retrieved from the Internet: URL: https://iopscience.iop.org/article/10.1088/2057-1976/aa91fb/pdf [retrieved on Jan. 31, 2025].

Magic Bodyfashion, "Boob Tape," 2025, Retrieved from the Internet: URL: https://magicbodyfashion.com/products/boob-tape-6-5-cm-x-500-cm [Retrieved from the Internet Mar. 27, 2025].

3M Science. Applied to Life., "3M TM Kind Removal Silicone Tape, 2770-2," 2025, Retrieved from the Internet: URL: https://www.3mae.ae/3M/en_AE/p/d/v000095346/ [Retrieved from the Internet Mar. 27, 2025].

* cited by examiner

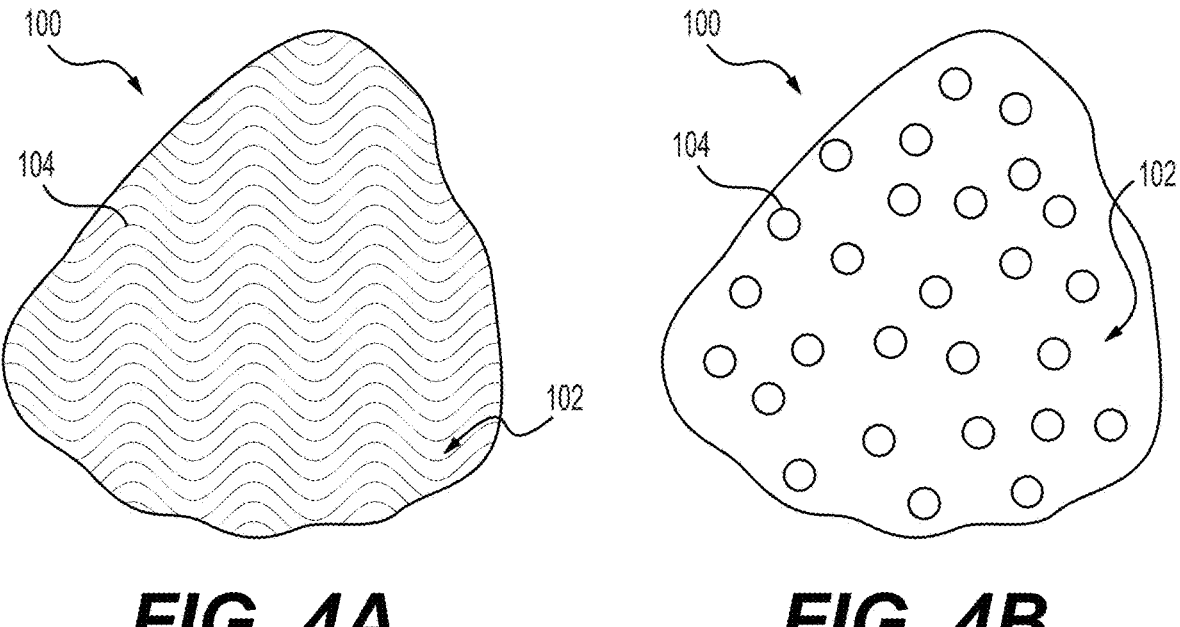
FIG. 4A                    FIG. 4B
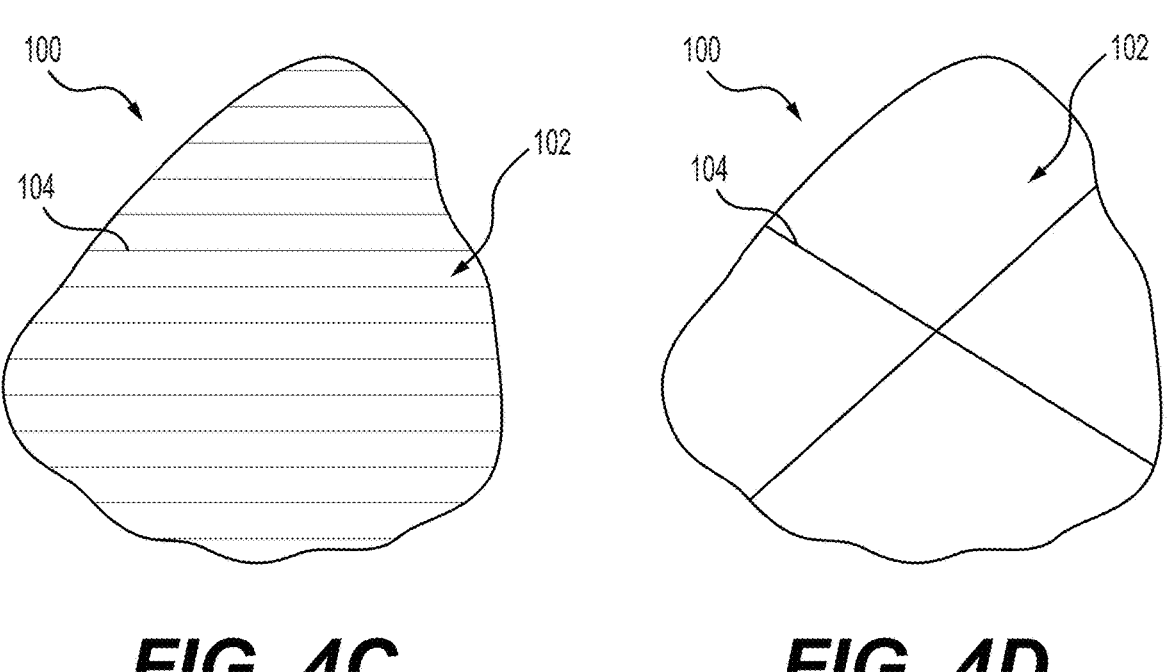
FIG. 4C                    FIG. 4D

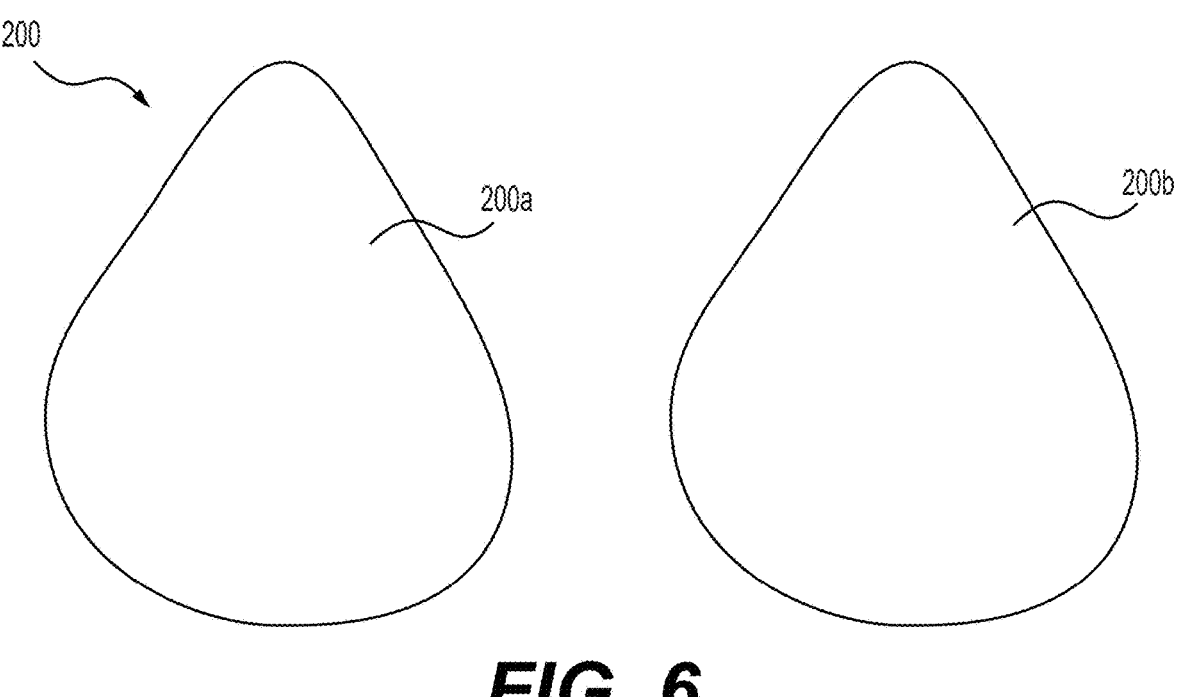
FIG. 6
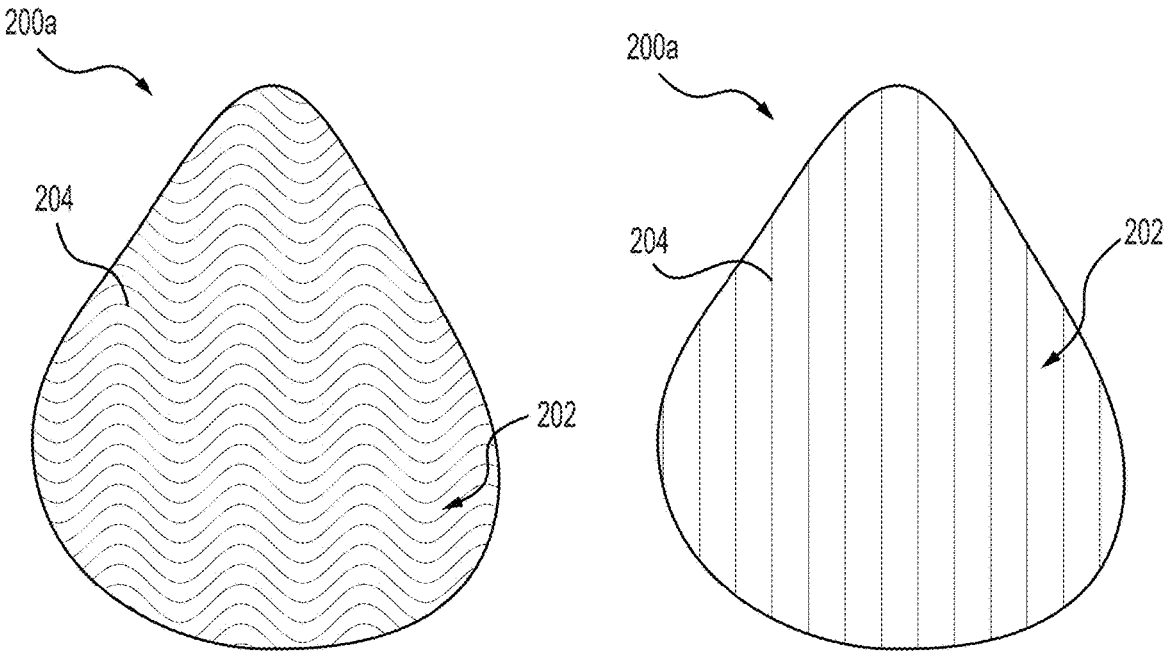
FIG. 7A          FIG. 7B

ADHESIVE GARMENT

CROSS-REFERENCE TO RELATED APPLICATIONS

This application claims priority to U.S. Provisional Application No. 63/652,974, filed on May 29, 2024, which is incorporated herein by reference in its entirety.

TECHNICAL FIELD

Various embodiments of the present disclosure relate generally to adhesive garments, and, more particularly, to adhesive garments that provide lift, support, and/or coverage to a variety of breast sizes without irritating and/or damaging the underlying tissue.

BACKGROUND

Adhesive garments (e.g., adhesive bras, nipple covers, or breast tapes) are often used to cover the breast as a backless and strapless alternative to traditional bras. Various types of adhesive bras include a pair of breast forms or molded cups made from a material, such as silicone or foam (e.g., polyester foam or polyurethane foam). An adhesive is typically applied to the inner surface of the cups or to wings extending from the sides or upper portions of the cups. However, when a user sweats, such adhesive bras may detach from the skin due to a buildup in moisture that pushes the cups and/or wings off of the skin in the absence of sufficient ventilation. Silicone molded cups, which are typically heavy, as well as foam cups may also inhibit ventilation of air and/or moisture from skin contributing to moisture buildup and loss of adhesion. While adhesive bra cups may cover a user's breasts, and in some instances pull the breasts inward (e.g., together) to provide cleavage when the cups are adjoined via a clasp, the cups fail to provide lift to the breasts. Furthermore, the requirement of using a mold to form the cups may also limit the sizes of adhesive bra cups that are manufactured and commercially available, which may make it more difficult to find adhesive bras that accommodate larger busts.

Adhesive tapes (e.g., sports tape, kinesiology/kinesio tape, or body tape) are used as another alternative to traditional bras. Adhesive tape may be cut into pieces and layered as desired to achieve the appropriate support for the breast, including larger breasts. Adhesive tape traditionally consists of breathable stretch fabric that allows for movement and evaporation of moisture, e.g., perspiration. However, adhesive tapes have a number of drawbacks. Adhesive tapes typically use an acrylic adhesive, including, e.g., acrylic-based adhesives. Acrylic adhesives have adhesion or binding properties that strengthen over time and cause the acrylic adhesive to fill gaps on the surface of skin and bind to hair follicles while the adhesive tape is in contact with the skin. As a result of these binding properties, acrylic adhesives may have a skin stripping effect that prevents repositioning the tape. Removing the acrylic adhesive tape may lead to painful skin pulling as well as potential skin trauma if a user does not follow the removal instructions. This is especially undesirable for the breast and nipple area. Many acrylic adhesive products require that specific instructions be followed to remove the tape without trauma, and users may fail to follow the instructions. Some users may also be allergic to acrylic based adhesives. In addition, cutting the adhesive tape into pieces for a desired look and fit may be time consuming and require a certain level of expertise.

Therefore, a need exists for an adhesive garment that provides support and lift to a variety of breast shapes and sizes, is breathable, easy to apply, and does not irritate the skin or cause pain upon removal.

SUMMARY OF THE DISCLOSURE

The present disclosure describes an adhesive garment for application to a skin surface of a user, the adhesive garment comprising a stretchable material including an anterior surface and a posterior surface, an adhesive, wherein the adhesive is formed of a silicone or a thermoplastic elastomer (TPE), and wherein the adhesive is applied to a portion of the posterior surface of the stretchable material, and a liner, wherein the liner is attached to a portion of a surface of the adhesive opposite from the stretchable material.

Various embodiments of the system may include one or more of the following features. The stretchable material may include at least one of polyester, cotton, nylon, hemp, or combinations thereof. The stretchable material may have an elasticity ranging from about 120% to about 220%, e.g., from about 150% to about 200%, from about 170% to about 190%. The stretchable material may have a four-way stretchable material. The adhesive may not comprise acrylic. The adhesive may be applied in a pattern of discrete shapes configured to promote air flow between the adhesive garment and the skin surface of the user during use. The adhesive may be applied in a wavelike, hexagonal, or linear pattern to the posterior surface of the stretchable material. The adhesive may be applied in a pattern such that a first portion of the adhesive garment has a first tack level and a second portion of the adhesive garment has a second tack level, the first tack level being less than the second tack level. The adhesive may be substantially free of solvents or hardeners. The adhesive may comprise silicone and the silicone adhesive may comprise crosslinked silicone. The adhesive may comprise TPE and the TPE may comprise rubber and a hydrocarbon. The TPE may comprise at least one of hydrogenated hydrocarbon resin and mineral oil saturated hydrocarbon.

The present disclosure also describes an adhesive garment for application to a breast area of a user, the adhesive garment comprising a first layer having an anterior surface and a posterior surface, wherein the first layer includes a lift portion, wherein the lift portion is configured to support a portion of the breast area during use, and a second layer including a thermoplastic elastomer (TPE) adhesive, wherein the TPE adhesive is applied to portions of the posterior surface of the first layer.

Various embodiments of the system may include one or more of the following features. The TPE adhesive may be applied in a pattern of discrete shapes configured to promote air flow between the adhesive garment and the user's breast area during use. The pattern may extend to an edge of the adhesive garment. The lift portion may be configured to support a lower portion of the breast and to adhere to an area underneath the breast during use. The first layer may include a winged outer portion configured to wrap around a side of the breast during use.

The present disclosure also describes an adhesive garment set comprising a first adhesive garment; and a second adhesive garment; wherein each of the first adhesive garment and the second adhesive garment include a first layer of breathable material and a second layer of thermoplastic elastomer (TPE) adhesive applied to a posterior surface of the first layer.

Various embodiments of the system may include one or more of the following features. The adhesive may be applied in a pattern of discrete shapes that provides spacing between portions of the adhesive to allow for air flow in the spacing between the portions of the adhesive. The pattern may be a wavelike, hexagonal, or linear pattern.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

There are many inventions described and illustrated herein. The described inventions are neither limited to any single aspect nor embodiment thereof, nor to any combinations and/or permutations of such aspects and/or embodiments. Moreover, each of the aspects of the described inventions, and/or embodiments thereof, may be employed alone or in combination with one or more of the other aspects of the described inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended to reflect or indicate the embodiment(s) is/are "example" embodiment(s).

FIGS. 4A-4D illustrate an exemplary adhesive layer according to one or more embodiments of the disclosure.

FIG. 6 illustrates an exemplary adhesive garment set according to one or more embodiments of the disclosure.

FIGS. 7A-7B illustrate exemplary adhesive layers according to one or more embodiments of the disclosure.

DETAILED DESCRIPTION OF EMBODIMENTS

Figure 1A:
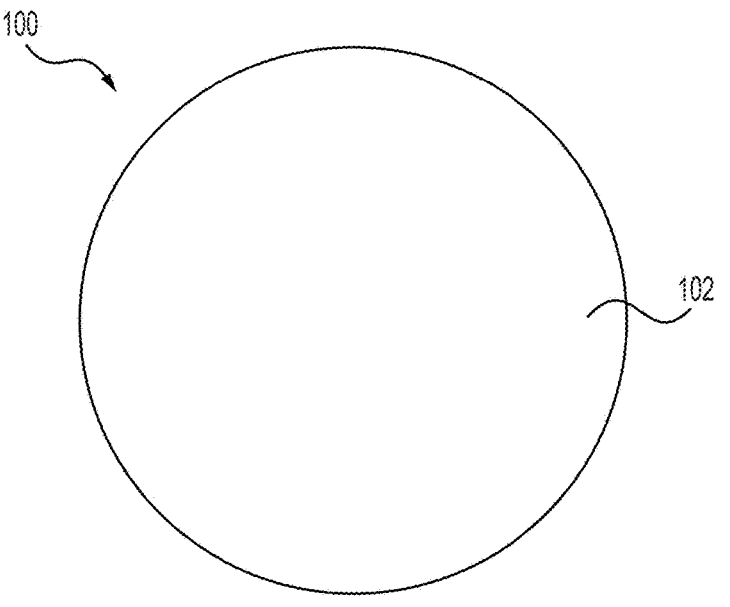
FIG. 1A illustrates an exemplary adhesive garment according to one or more embodiments of the disclosure.

The terminology used herein may be interpreted in its broadest reasonable manner, even though it is being used in conjunction with a detailed description of certain specific examples of the present disclosure. Indeed, certain terms may even be emphasized herein; however, any terminology intended to be interpreted in any restricted manner will be overtly and specifically defined as such in this Detailed Description section. Both the general description and the detailed description are exemplary and explanatory only and are not restrictive of the features, as claimed.

As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The use of the term "or" in the claims and specification is used to mean "and/or" unless explicitly indicated to refer to alternatives only, or the alternatives are mutually exclusive, although the disclosure supports a definition that refers to only alternatives and "and/or." As used herein "another" may mean at least a second or more.

In this disclosure, relative terms, such as, for example, "about," "substantially," "generally," and "approximately" are used to indicate a possible variation of +10% in a stated value. In addition, the term "between" used in describing ranges of values is intended to include the minimum and maximum values described herein.

The term "exemplary" is used in the sense of "example" rather than "ideal." As used herein, the singular forms "a," "an," and "the" include plural reference unless the context dictates otherwise.

In this disclosure, the term "based on" means "based at least in part on."

Spatially relative terms, such as "posterior", "anterior" "top," "bottom," "middle," "inner," "outer," "beneath," "below," "lower," "above," "upper," and the like, may be used herein for ease of description to describe one element or feature's relationship to another element(s) or feature(s) as illustrated in the drawings. As used herein, "anterior" means the surface or portion that is further away from a user during use, and "posterior" means the surface or portion that is closer to a user during use. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features.

As discussed above, backless and strapless alternatives to traditional bras are desirable because they allow a user to wear a variety of strapless, backless, and/or low cut garments without showing unwanted portions of a bra underneath. Common backless and strapless alternatives include preformed adhesive bra cups and adhesive tapes. However, these alternatives present a number of challenges. Adhesive bra cups, typically in the form of silicone cups or foam cups, are not breathable. Thus, regardless of how effective the adhesive is, the cups may still fall off a user's breasts when they begin to sweat. Users also face a similar issue when the adhesive is applied to wings or tabs extending from the cups.

As such, these adhesive bras are not suitable for wearing in the summer months or in warmer conditions when backless and strapless garments are most frequently worn. Additionally, while some adhesive bra cups can be drawn inward via a clasp or a connector to bring the breasts together and provide cleavage, there is no mechanism for lifting the breasts. Further, adhesive bra cups are typically not flexible or stretchable, which also contributes to their inability to provide proper support and lift to breasts. Thus, adhesive bra cups are particularly unsuitable for larger breasts and sagging breasts, where lift and support are most necessary.

Adhesive tapes (e.g., sports tape, kinesiology or kinesio tape, and body tape) are another alternative to traditional bras. Adhesive tapes may be used to provide lift and support to a wider variety of breast sizes, including large breasts. However, as mentioned above, the acrylic adhesive, including, e.g., acrylic-based adhesives, used on adhesive tapes, cause various issues for users, e.g., allergic reactions. Acrylic adhesives are mainly manufactured through emulsion polymerization. In this process, acrylate monomers are dispersed in water with surfactants, and an initiator is added to initiate the polymerization reaction. The polymer particles formed in this way are dispersed in water and form an emulsion. Acrylic monomers and/or acrylate components used in the polymerization reaction to form acrylic adhesives may cause skin troubles for users. For example, when a user is allergic to one or more acrylates, direct contact with acrylate monomers resulting from application of an acrylic adhesive to the skin can cause allergic contact dermatitis, characterized by itching, burning, scaling, hives, rashes, redness, and/or blistering at or proximate the area of contact.

Acrylic adhesive can also be painful and difficult to remove. Because acrylic adhesives adhere to and fill in the skin's surfaces and the bond strength increases over time, the skin and/or hair on the skin can be pulled upon removal, which causes pain. In some cases, the skin (e.g., dead skin cells) can even be pulled off by the adhesive tape, which can interfere with repositioning the adhesive tape and also result in skin trauma. Proper removal of acrylic adhesive to avoid skin trauma requires a user to carefully follow instructions, which may include applying an adhesive remover and removing the tape within a recommended time period. These removal requirements can be tedious and frustrating to a user, in addition to the time already spent cutting, fitting, and precisely applying the adhesive tape. Layering multiple pieces of adhesive tape may also cause the pieces to wrinkle and bunch together; creating a bulky appearance that may be seen through the outer garment. Furthermore, a user may need more tape depending on the style of the outer garment, the desired effect of the tape, and the breast size. In addition, adhesive tape is not typically reusable. In other words, any portions of adhesive tape that are removed during the application process (e.g., due to incorrect placement and/or undesired appearances) and/or after the user needs it, cannot be reused. As a result, the use of adhesive tape may cause excess waste and be more expensive, particularly for users with larger breasts.

The embodiments of the present disclosure are directed to solving, mitigating, and/or rectifying the above-mentioned issues by providing an adhesive garment that provides one or more of lift and support to a variety of breast sizes, is easy to apply and easy to remove, allows for ventilation of a user's skin, does not require cutting and/or applying multiple pieces to one breast, does not irritate the skin, does not cause excessive pain and/or skin trauma upon removal, allows for repositioning to facilitate application, and does not lose generally adhesion during the application process and/or when worn for long periods of time.

Embodiments of the present disclosure relate generally to an adhesive garment, and in particular, to an adhesive garment for application to a breast area. Suitable adhesive garments may include bras, nipple covers, or breast tapes that do not include acrylic adhesives. The adhesive garment may lift and support the breast. The adhesive garment may cover at least a portion of the breast. FIG. 1A depicts an exemplary adhesive garment 100. Adhesive garment 100 may include a first layer 102. First layer 102 may be made from a material as will be discussed in further detail below with respect to FIG. 2. First layer 102 may correspond to a first surface of adhesive garment 100. Portions of adhesive garment 100 may be planar or curved. Adhesive garment 100 may be pre-cut into a desired size and shape. For example, adhesive garment 100 may have a round or circular shape as shown in FIG. 1A. Other suitable shapes include, but are not limited to, ovals, "teardrop" shapes, ellipses, triangles, diamonds, squares, rectangles, semi-circles, and pear shapes. In some examples, adhesive garment 100 may have an irregular shape.

The shape of adhesive garment 100 may be selected based on desired coverage, support, and/or lift. For example, certain shapes may be selected for minimal or maximum coverage of a breast area. Other shapes may be selected for covering a portion of the breast area, such as the nipple area. In some embodiments, the shape of adhesive garment 100 may be selected to fit underneath a breast in order to provide lift and/or support. In some examples, the shape of adhesive garment 100 may be selected to wrap around the sides of a breast in order to provide lift and/or support. The shape of adhesive garment 100 may also be selected based on the design of a garment (e.g., outer garment) for wearing along with and/or on top of adhesive garment 100 or the size of the user's breast. For example, a shape that does not cover the lower portion of a breast or the side portion of a breast may be suitable for wearing with outer garments that have cutouts under the breast or side cutouts, respectively.

Figure 1B:
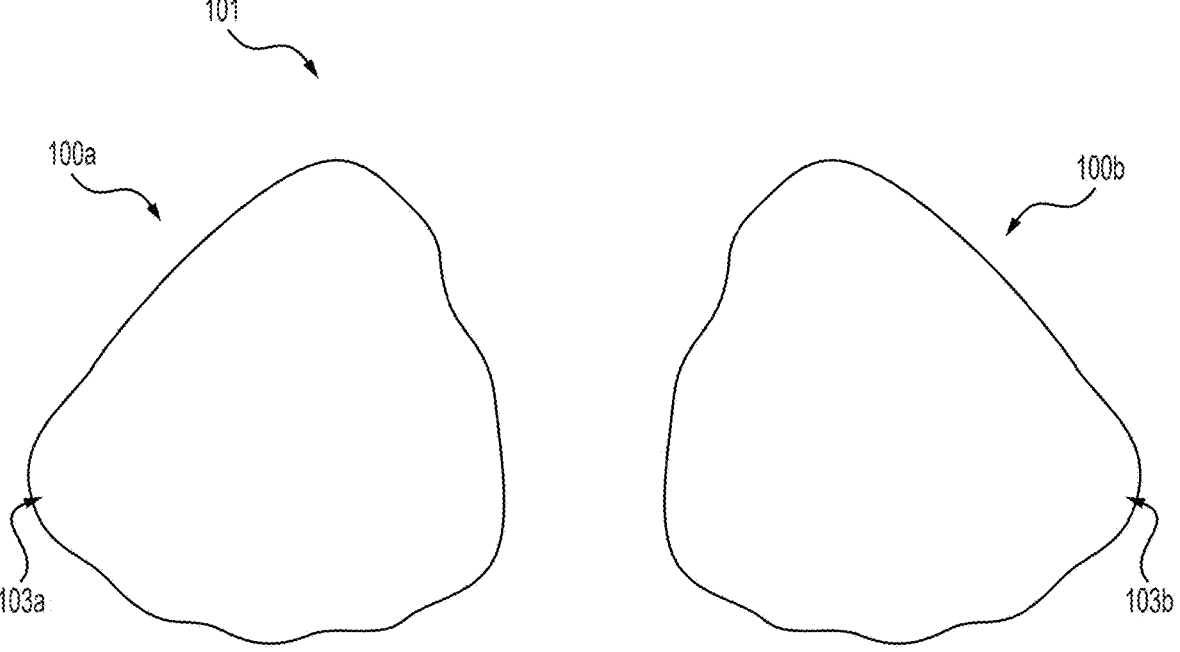
FIG. 1B illustrates an exemplary adhesive garment set according to one or more embodiments of the disclosure.

As shown in FIG. 1A, adhesive garment 100 may have rounded edges. In some examples, adhesive garment 100 may have wavy edges as depicted in FIG. 1B. Adhesive garment 100 may be manufactured having any of the shapes disclosed herein in a variety of sizes to support and lift a variety of breast sizes. In some embodiments, the shape and size of adhesive garment 100 may be designed based on the size of a user's breast. Adhesive garment 100 may be sized to cover, lift, and/or support breasts having sizes (e.g., breast cup sizes) ranging from, e.g., AA to K, as well as all sizes in between. For example, adhesive garment 100 may support and lift a breast having a size ranging from AA to H, such as from AA to G, from AA to F, or from AA to E, or from A to D, or from A to DDD, or from A to C. In at least one example, adhesive garment 100 may be designed for a breast having a size of D or greater, such as DD, DDD, DDDD, E, F, G, H, I, J or K.

Prior to conforming adhesive garment 100 to the breast and prior to application to the breast, adhesive garment 100 may have a height ranging from about 15 cm to about 40 cm and a width ranging from about 10 cm to about 30 cm. For example, a height of adhesive garment 100 may range from about 15 cm to about 35 cm, from about 15 cm to about 30 cm, from about 15 cm to about 25 cm, from about 17 cm to about 35 cm, from about 17 cm to about 30 cm, from about 17 cm to about 27 cm, from about 19 cm to about 25 cm, from about 20 cm to about 30 cm, from about 21 cm to about 26 cm, or from about 24 cm to about 26 cm. A width of adhesive garment 100 may range from about 10 cm to about 25 cm, from about 10 cm to about 18 cm, from about 12 cm to about 17 cm, from about 13 cm to about 16 cm, from about 10 cm to about 15 cm, or from about 14 cm to about 18 cm. Adhesive garment 100 may have a height to width ratio ranging from about 1:1, 2:1, 1:2, 3:2, 2:3, 4:3, or 3:4.

In some examples, a set of adhesive garments 100 may be provided. An adhesive garment set of the present disclosure may include a pair or at least two adhesive garments (e.g., adhesive garment 100).

FIG. 1B depicts an exemplary adhesive garment set 101. The adhesive garment set includes at least adhesive garment 100a, 100b. Each adhesive garment 100a, 100b may be applied to a breast, or more specifically, a different breast, of a user. For example, adhesive garment 100a may be applied to a first breast, while adhesive garment 100b may be applied to a second breast. In one example, adhesive garment 100a may be applied to a right breast and adhesive garment 100b may be applied to a left breast. Adhesive garment 100a and adhesive garment 100b may each have wavy edges. Wave-like edges of adhesive garment 100a, 100b may aid in the smooth application of adhesive garment 100a, 100b to a breast. The wavy edges may reduce the wrinkling effect attributed to traditional adhesive tapes upon application to the skin. Adhesive garment 100a, 100b may include a winged outer portion 103a, 103b for wrapping around or cupping the sides of a breast.

Adhesive garment 100a and adhesive garment 100b may be the same size and may have the same shape. In some examples, adhesive garment 100a may have a different size than adhesive garment 100b. Adhesive garment 100a may have a first size and adhesive garment 100b may have a second size. In other examples, adhesive garment 100a may have a different shape than adhesive garment 100b. Adhesive garment 100a may have a first shape and adhesive garment 100b may have a second shape.

Figure 2:
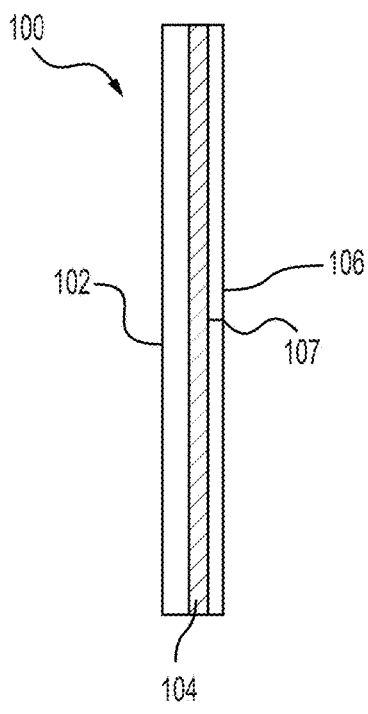
FIG. 2 illustrates an exemplary cross section of an adhesive garment according to one or more embodiments of the disclosure.

FIG. 2 illustrates a cross-sectional view of adhesive garment 100. Adhesive garment 100 may include at least two layers. In some examples herein, adhesive garment may comprise at least three layers. For example, adhesive garment 100 may have a first layer 102, a third layer 106, and a second layer 104 in between first layer 102 and third layer 106.

First surface 102 may be an anterior surface, i.e., front surface, of adhesive garment 100, such that first layer 102 may face away from a breast of a user when applied to the skin and may also be visible in the absence of outer garments that are worn with and/or over the adhesive garment 100.

First layer 102 may include a material that is flexible, stretchable, breathable, sweat proof, and/or waterproof. First layer 102 may also be referred to herein as a fabric layer 102. Exemplary fabrics include, but are not limited to, hemp, polyester, cotton, nylon, rayon, silk, linen, elastane and blends thereof. Fabric layer 102 may also include a recycled material, such as recycled polyester. Other breathable fabrics or blends may also be suitable. In at least one example, fabric layer 102 may comprise hemp. The fabric may have a weight ranging from about 150 to about 300 grams per square meter (gsm), such as from about 150 to about 250 gsm, from about 150 to about 200 gsm, from about 150 to about 175 gsm, from about 160 to about 190 gsm, from about 160 to about 185 gsm, from about 170 to about 180 gsm, from about 175 gsm to about 200 gsm, or from about 190 gsm to about 220 gsm. In some examples, fabric layer 102 may include a blend of hemp and nylon. For instance, fabric layer 102 may be made of about 1% to about 99% hemp and about 1% to about 99% nylon. An exemplary fabric layer 102 may comprise hemp in amounts ranging from about 10% to about 99%, from about 50% to about 97%, or from about 75% to about 95% and nylon in amounts ranging from about 1% to about 90%, from about 3% to about 50%, or from about 5% to about 25%.

First layer 102 may include a material having an elasticity ranging from about 120% to about 220%, e.g., from about 150% to about 200%, from about 170% to about 190%. For example, the fabric may be stretched up to about 180% of the resting length or width of adhesive garment 100. In some examples, first layer 102 is made from a four-way stretchable fabric. A four-way stretchable fabric provides for movement in four opposing directions. In other words, a four-way stretchable fabric provides elasticity across the fabric, allowing the fabric to stretch and recover both width and lengthwise. This property may facilitate conforming of adhesive garment 100 to a breast of a user and to move with the body. The use of a four-way stretchable fabric may also inhibit wrinkles and/or uneven edges when adhesive garment 100 is applied to the skin of a user. A four-way stretchable fabric may facilitate scooping of the breasts inward to provide a rounded appearance and may facilitate lifting of the breasts upward to provide desired lift.

In some examples, first layer 102 may further comprise a coating. For example, first layer 102 may comprise a waterproof coating to inhibit moisture on the anterior surface of adhesive garment 100. Fabric layer 102 may be any suitable color or shade. For example, fabric layer 102 may have a neutral color (e.g., white, brown, beige, taupe, tan, black, gray etc.). The color or shade of fabric layer 102 may be designed to camouflage with the skin tone of a user.

Second layer 104 may be adjacent to a posterior surface, i.e., back or second surface, of adhesive fabric layer 102 (FIG. 2). Second layer 104 may be adjacent to the posterior surface of adhesive garment 100 such that second layer 104 may face a breast of a user when applied to the skin or in the process of being applied to the skin. In some examples, second layer 104 may be applied to the posterior surface of first layer 102.

Second layer 104 may include an adhesive. As such, second layer 104 may also be referred to herein as an adhesive layer 104. Second layer 104 may include any appropriate adhesive. Such adhesive may be hypoallergenic, non-reactive, and biocompatible. In some examples, second layer 104 may include a silicone adhesive or a thermoplastic elastomer (TPE) adhesive. The thermoplastic elastomer adhesive may also be referred to herein as a thermoplastic polyurethane (TPU) adhesive or thermoplastic rubber (TPR) adhesive. The silicone adhesive, if used, may be prepared from silicone $(R_2SIO)_x$. In some examples, the silicone adhesive may have a siloxane structure in which silicone and oxygen atoms are alternatively bonded. For example, the silicone adhesive may include polydimethylsiloxane, cyclosiloxanes, silicone resins, or mixtures thereof. An exemplary silicone adhesive composition for second layer 104 may include from about 70 wt. % to about 90 wt. % polydimethylsiloxane and from about 14 wt. % to about 20 wt. % cyclosiloxanes. In some examples, the silicone may be crosslinked.

The TPE adhesive, if used, may be prepared from rubbers and polymers. Without being bound by theory, TPE combines the properties of both plastic and rubber, making it a versatile material with a soft, flexible feel. In some aspects, TPE gels may allow for some airflow between the adhesive and the skin of a wearer. TPE has a rubber-like flexibility and elasticity, while still maintaining the ability to be processed like plastic through manufacturing methods, e.g., molding and extrusion. In some embodiments, the TPE adhesive may include polypropylene, ethylene-propylene-diene rubber (EPDM), nitrile rubber (NBR), or any suitable rubber material. The TPE adhesive may include polymers chosen from one or more of polystyrene, polybutadiene, or any appropriate polymer. In some embodiments, the polymers may be chosen from hydrocarbons, e.g., hydrogenated hydrocarbon resin or mineral oil saturated hydrocarbons, or both hydrogenated hydrocarbon resin and mineral oil saturated hydrocarbon. In some aspects, the TPE may be in the form of a gel adhesive.

In some embodiments, the adhesive may include rubber materials and hydrocarbons. In some embodiments, the adhesive may include about 5% to about 60% rubber materials, relative to the total weight of the components of the adhesive. For example, the rubber materials may be present in an amount ranging from about 5% to about 55%, about 5% to about 50%, about 5% to about 45%, about 5% to about 40%, about 10% to about 60%, about 10% to about 55%, about 10% to about 50%, about 10% to about 45%, about 10% to about 40%, about 15% to about 60%, about 15% to about 55%, about 15% to about 50%, about 15% to about 45%, about 15% to about 40%, about 20% to about 60%, about 20% to about 55%, about 20% to about 50%, about 20% to about 45%, about 20% to about 40%, about 20% to about 30%, about 25% to about 40%, or about 25% to about 35%, relative to the total weight of the components of the adhesive.

In some embodiments, the adhesive may include about 30% to about 90% hydrocarbons, relative to the total weight of the components of the adhesive. For example, the hydrocarbons may be present in an amount ranging from about 30% to about 85%, about 30% to about 80%, about 30% to about 75%, about 30% to about 70%, about 30% to about 65%, about 30% to about 60%, about 30% to about 55%, about 30% to about 50%, about 30% to about 40%, about 35% to about 90%, about 35% to about 85%, about 35% to about 80%, about 35% to about 75%, about 35% to about 70%, about 35% to about 65%, about 35% to about 60%, about 35% to about 55%, about 35% to about 50%, about 35% to about 45%, about 35% to about 40%, about 40% to about 90%, about 40% to about 85%, about 40% to about 80%, about 40% to about 75%, about 40% to about 70%, about 40% to about 65%, about 40% to about 60%, about 40% to about 55%, or about 40% to about 50%, relative to the total weight of the components of the adhesive.

In some embodiments, the adhesive may include hydrogenated hydrocarbon resin, mineral oil saturated hydrocarbon, or a mixture of both. The adhesive may include about 10% to about 60% hydrogenated hydrocarbon resin, relative to the total weight of the components of the adhesive. For example, the hydrogenated hydrocarbon resin may be present in an amount ranging from about 10% to about 55%, about 10% to about 50%, about 10% to about 45%, about 10% to about 40%, about 15% to about 60%, about 15% to about 55%, about 15% to about 50%, about 15% to about 45%, about 15% to about 40%, about 20% to about 60%, about 20% to about 55%, about 20% to about 50%, about 20% to about 45%, or about 20% to about 40%, relative to the total of the components of the adhesive. The adhesive may include about 10% to about 60% mineral oil saturated hydrocarbon, relative to the total weight of the components of the adhesive. For example, the mineral oil saturated hydrocarbon may be present in an amount ranging from about 10% to about 55%, about 10% to about 50%, about 10% to about 45%, about 10% to about 40%, about 15% to about 60%, about 15% to about 55%, about 15% to about 50%, about 15% to about 45%, about 15% to about 40%, about 20% to about 60%, about 20% to about 55%, about 20% to about 50%, about 20% to about 45%, or about 20% to about 40%, relative to the total of the components of the adhesive.

In one example, a suitable TPE gel adhesive may include about 20% to about 40% by weight synthetic rubber, about 20% to about 40% by weight hydrogenated hydrocarbon resin, and about 20% to about 40% by weight mineral oil saturated hydrocarbon.

The adhesive strength and shear strength (e.g., cohesion) of TPE adhesive may be adjusted by changing the quantities of the components described above. For example, the quantities of the synthetic rubber, hydrogenated hydrocarbon resin, and/or mineral oil saturated hydrocarbon, may be adjusted to alter properties of the TPE adhesive, including, e.g., adhesive strength and shear strength. Adjusting synthetic rubber materials, e.g., may adjust adhesion and cohesion. Adjusting hydrogenated hydrocarbon resins may adjust adhesion. Adjusting mineral oil saturated hydrocarbons may adjust the flexibility and processability of the adhesive, and may allow for adjustment of adhesion. Tack levels may also be modified by modifying the formulation. By adjusting plasticizer levels or polymer blends, manufacturers can fine-tune the "stickiness" to match the desired product feel. Further, flexibility and processability, i.e., the ease and effectiveness with which material can be transformed into a desired form or shape through various manufacturing processes, may be adjusted by modifying the formulation, e.g., the quantity of mineral oil saturated hydrocarbon.

In some embodiments, adhesives used to coat first layer 102 and form adhesive layer 104 may be free of solvents or may have few solvents. For example, the TPE and/or silicone adhesive may be free of solvents. Solvents, e.g., methylene chloride, toluene, tetrahydrofuran, cellusolve, and methyl ethyl ketone, are chemical compounds used to bond acrylic-based polymers to equivalent or similar materials. Solvents are typically in a liquid state and may also dissolve or dilute other substances. As mentioned above, acrylic adhesives are manufactured by polymerizing acrylate monomers. A solvent is used to dissolve the adhesive, and then the adhesive is applied to a surface, e.g., a fabric or paper, through a coating process. After the adhesive is applied to the desired surface, the adhesive and surface are dried to evaporate the solvent. In addition, additives, e.g., a hardener, are added during the manufacturing process to balance the adhesiveness and cohesion levels of the resulting adhesive. The adhesive and surface may also be cured, if needed. Solvents that are typically used in adhesives are skin irritants and may cause a user's skin issues, e.g., contact dermatitis, as discussed above.

The adhesives used herein may be pure organic compounds and may not contain agents, such as additives, that may cause skin trouble. For example, the adhesives disclosed herein for adhesive layer 104 may be solvent free or have fewer solvents. When applying a TPE adhesive, for example, the TPE adhesive may be heated to a liquid state and then applied directly to first layer 102. Since no solvent may be present in the TPE, drying and/or curing steps may not be required after application of the adhesive to first layer 102. The application process of adhesives herein, as opposed to acrylic adhesives, may be relatively simple and environmentally friendly compared to acrylic adhesives, In some embodiments, second layer 104 may only include a silicone adhesive (e.g., 100% silicone). In some embodiments, second layer 104 may only include a TPE adhesive. In some examples, second layer 104 may be free from acrylic (e.g., acrylic-free). Unlike with acrylic adhesives, an adhesive as disclosed herein may be removed from skin without removing a significant number of dead skin cells or stripping the skin. The silicone or TPE adhesives may be suitable for users allergic to one or more acrylates found in acrylic adhesives, and thus may be considered a skin friendly alternative to an acrylic adhesive. Applying adhesive layer 104, which may include a silicone adhesive or a TPE adhesive, to the skin may reduce the likelihood of or prevent symptoms of allergic contact dermatitis (e.g., itching, burning, hives, scaling, and/or blistering) at the application site normally attributed to direct skin contact with acrylate monomers in users having a known or unknown allergy to acrylates.

In the case of silicone adhesives, it is believed that a silicone matrix may provide an internal spring or stretching effect, such that the silicone may be capable of absorbing energy internally, which may cause the silicone adhesive to stretch upon removal. A stretching of the silicone adhesive upon removal or peeling away from the skin may prevent, inhibit, or reduce stretching of the underlying skin tissue. The ability of silicone to absorb energy upon removal may lessen the pulling effects (e.g., force and strength) exerted on the skin. A silicone adhesive may adhere to the surfaces of skin upon initial application, providing for a low-energy connection that separates more easily from the surface of skin. The silicone matrix may also allow for stretching of the silicone adhesive upon application and/or during use, e.g., for wearers with larger busts and wearers who are physically active. It is believed that the silicone adhesives possess elastic memory, meaning that the silicone adhesives may stretch and then return to their original form without substantially losing its initial properties, e.g., adhesive strength. The stretchability may allow the adhesive garment to move with the wearer, providing flexibility and comfort while maintaining structural support. Similarly, as discussed above, TPE adhesives may provide flexibility, softness, and comfort while providing structural support.

The properties of adhesives described herein differ from acrylate adhesives, which adhere to the skin's surface and then fill into the gaps within the skin's surface as the acrylic warms and as the time of skin contact increases, causing skin adhesion or bonding to build over time. Increased skin adhesion or bonding may cause discomfort and/or loss in tack or adhesion levels over time. Rubber TPE adhesives have a strong immediate adhesion, i.e., stickiness, without the need to apply prolonged pressure. Although this stickiness may lessen over time, the adhesion provided may be sufficient for use with a lightweight adhesive garment, such as a breast covering. Adhesion levels of TPE adhesives may also depend on a user's skin. Silicone adhesives described herein may provide a comparatively consistent adhesion to skin over time, in varying climates and temperatures. For example, in some aspects, adhesive layer 104 may have a substantially consistent adhesion level, e.g., the low energy connection as described above, to the skin for the duration of wear. The adhesion level of adhesive layer 104 comprising silicone or TPE may also inhibit the adhesive garments from detaching from the skin, i.e., falling off of the skin, during wear. This may allow for prolonged wear of garments disclosed herein without the need for reapplication.

The adhesives disclosed herein may also adapt to the user's body temperature. For example, the silicone or TPE adhesives described herein may soften slightly with body heat, enhancing conformity to the skin's micro-contours while maintaining adequate adhesion to the skin. Further, the adhesives may also have hydrophobic properties, making them less affected by sweat, humidity, and/or oils that may be produced by the body of the user, as compared to acrylic adhesives.

Acrylic adhesives may comparatively degrade rapidly after their initial use. By comparison, the adhesives described herein may retain their initial properties after longer uses or multiple uses and/or applications as compared to acrylic adhesives, and as such, the adhesives herein promote sustainability by reducing the number of adhesive garments that a wearer may need to purchase and utilize. The adhesives herein may also be cleaned, e.g., with soap and/or water, without noticeably impacting properties of the adhesives, e.g., tack, cohesion, and peel strength, again promoting reuse.

Adhesives generally comprise one or more tackifiers, which are used to increase the stickiness of an adhesive or the tack, a property attributed to how quickly an adhesive bond is formed when two surfaces are brought together under light pressure. Tackifiers may include resins, such as rosin resins, polyterpene resins, and petroleum resins. However, certain tackifiers, e.g., acrylic adhesives, may cause skin irritation. In some examples, adhesive layer 104 may have fewer irritating tackifiers or may be free from any irritating tackifiers. Due to the hypoallergenic properties of silicone and TPE, in some examples herein, adhesive layer 104 may comprise a resin, e.g., a hydrogenated hydrocarbon resin, a silicone resin, or a silicate resin as a tackifier that does not cause skin irritation. Thus, adhesive layer 104 may be free from tackifiers that normally cause skin irritation. In at least one example, the adhesive (e.g., silicone or TPE) used for adhesive layer 104 may be free from one or more of the following: non-silicone tackifiers, plasticizers, and stabilizers. In some examples, adhesive layer 104 may include silicone resins or silicate resins (e.g., MQ resins) as tackifiers. In at least one example, a concentration of a silicone tackifier in adhesive layer 104 may be varied to achieve desired adhesive properties, such as, e.g., high level of tack. For example, a ratio of polydimethylsiloxane to silicate resin may be varied to achieve a desired tack. In some examples, adhesive layer 104 may include less than about 5 wt. % of a non-silicone tackifier.

Adhesive layer 104 may have a thickness ranging from about 100 µm to about 10 mm, about 250 µm to about 5 mm, about 500 µm to about 5 mm, about 500 µm to about 800 µm, about 600 µm to about 800 µm, about 620 µm to about 750 µm, about 620 µm to about 700 µm, about 620 µm to about 650 µm, about 630 µm to about 700 µm, about 640 µm to about 740 µm, about 1 mm to about 5 mm, about 1.5 mm to about 4.5 mm, or about 2 mm to about 3 mm. In some examples, the thickness of adhesive layer 104 may substantially be uniform. In other examples, the thickness of adhesive layer 104 may vary. In general, the adhesive strength of the adhesive may increase proportionately to the thickness of the adhesive layer 104. Accordingly, relatively thinner areas may have less adhesive strength compared to relatively thicker layers. The thickness of the adhesive in adhesive layer 104 may be less in areas corresponding to sensitive areas of the skin. For example, the thickness of adhesive layer 104 may be less in the nipple area or in an area proximate the nipple. Adhesive layer 104 may be thicker in areas that correspond to underneath the breast and/or the sides of the breast. A thickness of adhesive layer 104 may be selected to inhibit the leaving behind of adhesive residue on the skin upon removal.

In certain embodiments, adhesive layer 104 may be applied to a surface of fabric layer 102 in a pattern, such as the exemplary patterns shown in FIGS. 4A-4D. Exemplary patterns may be achieved by applying less adhesive layer 104 in some areas as compared to other areas, i.e., by using a thickening or thinning of adhesive layer 104. Exemplary patterns may alternatively or additionally be achieved by applying no adhesive layer 104 in some areas as compared to other areas, or by using a combination thereof. Applying adhesive layer 104 in a pattern may provide for spacing between the adhesive and fabric layer 102 or between thicker and thinner regions of adhesive layer 104. Such spacing may allow air and moisture to flow through the adhesive layer 104 and thus the adhesive garment 100, while maintaining the properties of the adhesive garment 100 and/or adhesive layer 104, e.g., tack and peel strength. In some embodiments, adhesive layer 104 may be applied in a macro- or micro-pattered technique, e.g., in lines, hexagons, and/or waves. In some aspects, discrete shapes, or islands, of adhesive may be applied in a macro- or micro-patterned technique in order to promote airflow and allow for the evaporation of moisture, e.g., sweat. Such discrete shapes or islands may be in the form of dots, polygons, honeycombs, or irregular shapes like drops.

In some embodiments, exemplary patterns, as shown in FIGS. 4A-4D, may produce varied adhesive zones with differing tack levels. For example, portions of adhesive garment 100 may have a higher tack or adhesive strength level compared to other portions of the adhesive garment 100. Portions of the adhesive garment 100 having a higher tack or adhesive strength level may provide stronger adhesion to the skin in areas needing such support, and portions of the adhesive garment 100 having a lower tack or strength level may provide softer adhesion to sensitive regions of the skin. For example, stronger adhesion levels may be desired on portions of the adhesive garment 100 configured to overlay the underneath portion of the breast area, and lesser adhesion levels may be desired on portions of the adhesive garment 100 configured to overlay sensitive areas of the breasts, e.g., the areola. In some examples, adhesive garment 100 may have a first portion having a first tack level and a second portion having a second tack level, wherein the first tack level may be less than the second tack level. In other examples, the first tack level may be greater than the second tack level. In some examples, adhesive garment 100 may include at least two portions with different tack levels from one another, at least three portions with different tack levels from one another, at least four portions with different tack levels from one another, or at least five portions with different tack levels from one another. Adhesive layer 104 may be applied to fabric layer 102 in a pattern or a combination of patterns to produce the portions of adhesive garment 100 with different tack levels from one another. In certain embodiments, adhesive layer 104 may be applied to a surface of fabric layer 102 as a coating (e.g., a full coating layer) across the entire surface of fabric layer 102 in a substantially consistent thickness such that no discernable pattern is used.

The adhesive performance of adhesive layer 104 may be measured by, e.g., tack, shear strength, and/or peel adhesion tests. Tack may measure how quickly an adhesive bond is formed when two surfaces are brought together with light (e.g., minimal) pressure. Tack may demonstrate the initial tendency of the adhesive to stick to the skin, and may thus be a short-term measurement of skin adhesion. In order to hold adhesive layer 104 in position upon application of adhesive garment 100, a high level of tack may be desired. Tack may be measured using a loop tack test, a probe tack test, or a rolling ball tack test, for example. Such tests may measure the instant adhesion of the adhesive used for adhesive layer 104. A loop tack test may measure tack (e.g., loop tack) of an adhesive by forming a film loop with a coated adhesive facing the outer side, bringing the loop down on a surface of choice for a brief moment, and lifting the loop back up to measure the pull-back force. A probe tack test may measure tack of an adhesive by using a probe to contact the surface of the adhesive and compressing it until a specific load is reached, holding the probe at that position for a dwell time, displacing the probe at a constant speed in the direction opposite to the loading until failure within the adhesive or at the interfaces occurs, and recording the force-displacement history.

Adhesive strength may evaluate how well an adhesive bond can withstand various forces. A test of adhesive strength may be performed by tensile, shear, and peel strength tests, which determine the force required to separate the bonded materials. Adhesive strength of adhesive layer 104 may range from about 500 g/inch to about 2500 grams/inch (g/in). For example, adhesive strength of adhesive layer 104 may range from about 500 g/in to about 2200 g/in, about 500 g/in to about 2000 g/in, about 500 g/in to about 1800 g/in, about 500 g/in to about 1600 g/in, about 500 g/in to about 1400 g/in, about 500 g/in to about 1200 g/in, about 800 g/in to about 2500 g/in, about 800 g/in to about 2200 g/in about 800 g/in to about 2000 g/in, about 800 g/in to about 1800 g/in, about 800 g/in to about 1600 g/in, about 800 g/in to about 1400 g/in, about 800 g/in to about 1200 g/in, about 1000 g/in to about 2500 g/in, about 1000 g/in to about 2200 g/in, about 1000 g/in to about 2000 g/in, about 1000 g/in to about 1800 g/in, about 1000 g/in to about 1600 g/in, or about 1000 g/in to about 1400 g/in.

Shear strength, also known as cohesion, may reflect the internal or cohesive strength of an adhesive. A shear test of an adhesive may be performed by mounting an adhesive-coated substrate vertically with a given weight attached. Shear strength may be measured by the time required for the weight to cause the substrate to detach or come loose, demonstrating the durability of a bond. Shear strength may describe the ability of an adhesive to resist shearing forces.

Peel adhesion may be determined by the ability of an adhesive to resist separation from the skin surface after a period of application. Peel force (e.g., peel strength) or peel adhesion is a measure of the force needed to break the bond between an adhesive and the surface it is applied to, which may determine the strength of the bond. In a peel test, an adhesive-coated substrate may be applied to a test panel or against another adhesive substrate and allowed to sit before being pulled away. Testing parameters, such as direction at a straight or right angle, application rate of pressure, and dwell time, may be standardized based on bond type and intended performance measurement. Standards may be provided by Pressure Sensitive Tape Council (PSTC) and ASTM International.

Various compositions (e.g., silicone or TPE adhesives) may be used for adhesive layer 104 and may be applied to fabric layer 102 at various thicknesses to achieve desired properties, such as tack, shear strength (e.g., cohesion), and peel strength for adhesive layer 104. For example, a higher thickness of adhesive layer 104 may be applied to achieve a higher peel strength. In some examples, adhesive layer 104 may have a high peel strength. Adhesive layer 104 may be formulated to provide for high tack. In at least one example, adhesive layer 104 may be formulated to have a balance between the level of tack and the level of cohesion. In some examples, adhesive layer 104 may have a high level of cohesion or shear strength (e.g., high cohesive strength) to ensure that adhesive layer 104 remains intact. Removal of adhesive layer 104 may occur at a low peel force in the absence of skin stripping and painful skin pulling. Further, the low peel force of silicone s and TPE adhesives may allow for effective adherence to a surface, e.g., skin, without bonding aggressively to the skin. As a result, silicone and TPE adhesives may reduce the risk of skin trauma, redness, and/or irritation upon removal from the skin, as discussed above.

Peel force may be measured in gram force (gf). In some embodiments, the peel force of adhesive layer 104 may range from about 25 gf to about 400 gf. For example, the peel force of adhesive layer 104 may range from about 25 gf to about 350 gf, about 25 gf to about 300 gf, about 25 gf to about 250 gf, about 25 gf to about 200 gf, about 50 gf to about 400 gf, about 50 gf to about 350 gf, about 50 gf to about 300 gf, about 50 gf to about 250 gf, about 50 gf to about 200 gf, about 75 gf to about 400 gf, about 75 gf to about 350 gf, about 75 gf to about 300 gf, about 75 gf to about 250 gf, about 75 gf to about 200 gf, about 100 gf to about 400 gf, about 100 gf to about 350 gf, about 100 gf to about 300 gf, about 100 gf to about 250 gf, or about 100 gf to about 200 gf. The exact peel force may depend, at least in part, on the size of the product or the portion of the body to which the product is intended to be applied.

Referring to FIG. 2, third layer 106 may serve as a covering for adhesive layer 104. Third layer 106 may be applied to the surface of adhesive layer 104 that is opposite from the surface of adhesive layer 104 in contact with fabric layer 102. Third layer 106 may be used to prevent premature exposure of adhesive layer 104. For instance, third layer 106 may be placed on the posterior surface, i.e., back surface, of adhesive layer 104. In other words, third layer 106 may serve as a backing for adhesive garment 100 and a release liner for adhesive layer 104. Third layer 106 may also be referred to herein as a liner layer 106. Inclusion of liner layer 106 may prevent adhesive layer 104 from sticking to other materials prior to use and to keep the adhesive layer 104 clean prior to use. Liner layer 106 may cover substantially the entire surface of adhesive layer 104. Liner layer 106 may be substantially flat and sheet-like. Liner layer 106 may also be flexible. Liner layer 106 may be removable or detachable from adhesive layer 104. In some examples, liner layer 106 may be reused. For example, liner layer 106 may be reapplied to adhesive layer 104 after adhesive garment 100 is removed from the breast. This may allow adhesive garment 100 to be reusable. Adhesive garment 100 may be reused and worn multiple times after the first use. For example, adhesive garment 100 may be reused 1 to 10 times, 1 to 5 times, 1 to 3 times, at least 5 times, at least 10 times, at least 15 times, at least 20 times, at least 25 times or at least 30 times, after the first use. In some embodiments, adhesive garment 100 may be single use.

Liner layer 106 may comprise a non-stick material that is compatible with adhesive layer 104. The material for liner layer 106 may not interact or interfere with adhesive layer 104. In some embodiments, liner layer 106 may comprise a non-silicone material and/or a non-TPE material. Liner layer 106 may comprise a non-silicone material and/or a non-TPE material to avoid having a composition that is similar to any silicone-based or TPE-based adhesive that may be in adhesive layer 104, which may cause the layers to interact and stick together. The material for liner layer 106 may allow for reapplication to adhesive layer 104, e.g., after adhesive garment 100 is worn. Exemplary materials which may be used for liner layer 106 include a coated release paper (e.g., fluorine-coated release paper), fluorinated polyethylene terephthalate (PET), uncoated polyethylene films such as lowdensity polyethylene (LDPE), or any other appropriate materials. In some examples, liner layer 106 may include fluorinated PET.

In some embodiments, liner layer 106 may include at least one component for both removal from and reapplication to adhesive layer 104. For example, liner layer 106 may include two separable components or pieces of liner layer. A partitioning line 107 may divide liner layer 106 into two separable components, which may each be separately removed from adhesive layer 104 as described in further detail below with respect to FIG. 3. In certain embodiments, liner layer 106 may not have the partitioning line 107 and liner layer 106 may be a single, removable component. In other embodiments, liner layer 106 may include a plurality of partitioning lines 107 so that liner layer 106 is designed to be removed from adhesive layer 104 in multiple pieces.

In some examples, liner layer 106 may have a different thickness than fabric layer 102. For example, liner layer 106 may be relatively thin and may have a lower thickness than fabric layer 102. In other examples, liner layer 106 may have the same thickness as fabric layer 102 or may be thicker than fabric layer 102. Liner layer 106 may also have the same thickness as adhesive layer 104. Alternatively, liner layer 106 may have a different thickness than the thickness of adhesive layer 104. Further, the thickness of fabric layer 102 may be more, less, or equal to liner layer 106 or adhesive layer 104.

Adhesive garment 100 may have a total thickness ranging from about 1 mm to about 20 mm, such as from about 1 mm to about 15 mm, from about 2 mm to about 12 mm, from about 2 mm to about 10 mm, from about 2 mm to about 5 mm, or from about 3 mm to about 5 mm. The total thickness of adhesive garment 100 may include fabric layer 102, adhesive layer 104, and liner layer 106. Fabric layer 102 may have a thickness ranging from about 0.1 mm to about 5 mm, such as from about 0.2 mm to about 0.5 mm, from about 0.5 mm to about 4 mm, from about 1 mm to about 3 mm, or from about 2 mm to about 3 mm. Adhesive layer 104 may have a thickness as described above. Liner layer 106 may have a thickness ranging from about 0.05 mm to about 1 mm, such as from about 0.05 mm to about 0.1 mm, from about 0.1 mm to about 0.3 mm, from about 0.5 mm to about 0.7 mm, or from about 0.5 mm to about 1 mm.

Figure 3:
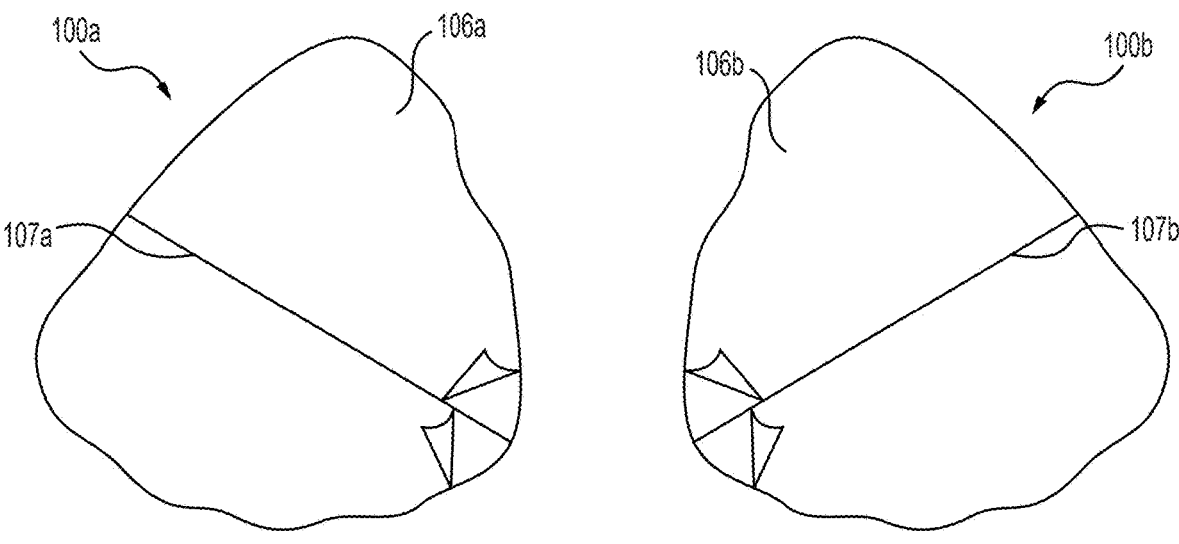
FIG. 3 illustrates an exemplary posterior surface of an adhesive garment according to one or more embodiments of the disclosure.

FIG. 3 shows a posterior view, i.e., a back view of adhesive garment 100*a* and adhesive garment 100*b*. In some examples herein, adhesive garment 100*a*, 100*b* may include liner layer 106 (in this case, is formed of liner layers 106*a*, 106*b*) applied to the posterior surface of adhesive layer 104. As shown in FIG. 3, as liner layer 106 is removed, adhesive layer 104 may be uncovered and thus exposed. Liner layer 106 may be peelable, such that liner layer 106 is capable of being peeled off or away from adhesive layer 104. As discussed above, in some embodiments, partitioning line 107 (collectively referring to partitioning lines 107*a*, 107*b*) may provide for a separation between sections of liner layer 106. In at least one example, partitioning line 107 may be visible along the surface of adhesive layer 104 as shown in FIG. 3. Partitioning line 107 may provide for a separation or a division between a first section of liner layer 106 and a second section of liner layer 106. Each section of liner layer 106 may correspond to and be designed to cover a section of adhesive layer 104 that is underneath liner layer 106. Such a configuration allows a user to remove a first section of liner layer 106 and a second section of liner layer 106 at different times. For example, a user may peel off one section of liner layer 106 at a time, while the other section remains as a covering over a corresponding section of the underlying adhesive layer 104. In some scenarios, a user may desire to apply a first section of adhesive layer 104 underneath a breast. While the first section of adhesive layer 104 is being secured in place, a second section of adhesive layer 104 may remain covered by the corresponding section of liner layer 106 until the user is ready to apply the second section of adhesive layer 104, e.g., to provide a desired lift and/or shape to the breast.

Although FIG. 3 depicts liner layer 106 on each of adhesive garment 100*a*, 100*b* as having one partitioning line 107, in some examples herein, liner layer 106 may have a plurality partitioning lines. For example, adhesive garment 100 may include at least two partitioning lines to divide liner layer 106 into quadrants. Each section may be removed at a time. In other examples, adhesive garment 100 may not include partitioning line 107, and liner layer 106 may be removed all at once. As shown in FIG. 3, liner layer 106 may correspond to the shape and dimensions of fabric layer 102 underneath adhesive layer 104. However, the present disclosure also includes adhesive garments where liner layer 106 may be larger than the corresponding adhesive garment. For example, liner layer 106 may serve as a base that is larger than fabric layer 102 and adhesive layer 104. Upon removal, the surface of adhesive layer 104 may be peeled away from liner layer 106 like a sticker.

After liner layer 106 has been removed from adhesive layer 104 of adhesive garment 100, liner layer 106 may be reapplied to adhesive layer 104. In examples where the adhesive garment 100 includes partitioning line 107, each section of liner layer 106 that corresponds to a section of adhesive layer 104 divided by partitioning line 107 may be reapplied to adhesive layer 104 one section at a time. The entire liner layer 106 may be reapplied to adhesive layer 104 in examples where there is no partitioning line 107. Liner layer 106 or sections thereof may be reapplied to adhesive layer 104 by aligning liner layer 106 with the underlying adhesive layer 104 and pressing liner layer 106 against the surface of adhesive layer 104. In some examples, liner layer 106 may be reused according to the reapplication steps above, after liner layer 106 has been removed. In other examples, a new liner layer 106 may be applied to adhesive layer 104 after the previous liner layer 106 has been removed.

As described above, an adhesive may be applied to a posterior surface of adhesive garments disclosed herein. In some examples, the adhesive may cover the entire posterior surface or a substantial portion of the posterior surface of the adhesive garment. In some examples, an adhesive may be applied to a posterior surface of the adhesive garment in a designated pattern. FIGS. 4A-4D depict exemplary patterns for the application of adhesive layer 104. An adhesive according to the present disclosure, e.g., a silicon adhesive, may be applied to the posterior surface of fabric layer 102 in a variety of patterns to form adhesive layer 104. The pattern of adhesive layer 104 may allow for the flow of air and/or moisture between a user's skin and the adhesive garment. For example, a design pattern may provide spacing between the adhesive portions on the posterior surface of fabric layer 102, allowing for portions of fabric layer 102 to be free of adhesive. This spacing, which may be referred to herein a passageways, may allow air to flow between the skin of the user and fabric layer 102, reducing the buildup of moisture, e.g., sweat. The design patterns may also allow air and/or moisture to travel along the passageways, from one edge of fabric layer 102 to an opposite edge of fabric layer 102. The adhesive may be applied to fabric layer 102 in any appropriate design pattern, such that the design pattern allows for air flow between adhesive garment 100 and a user's skin and moisture (e.g., sweat) evaporation from a user's skin. In some embodiments, airflow may be promoted by having thinner portions of adhesive layer 104, or portions without adhesive layer 104, extend to one or more edges of adhesive garment 100, so that air may fluidly communicate with interior regions of adhesive garment 100 when worn. Exemplary design patterns will be discussed in detail below. While airflow is contemplated in FIGS. 4A-4D, some patterns of adhesive layer 104 may have at least some sections that do not fluidly communicate with an edge of adhesive garment 100.

One exemplary pattern for adhesive layer 104 is a wave pattern. As shown in FIG. 4A, an adhesive may be applied in a plurality of waves. The plurality of waves may span the entire posterior surface of the adhesive garment 100 and provide for spacing or areas of fabric layer 102 where the adhesive is not present, or is present in a thinner or thicker amount compared to adjacent areas. In other aspects, the adhesive layer 104 may form a wave pattern in which the adhesive is absent along the wavy lines. Although solid, continuous waves are shown in FIG. 4A, the wave pattern may be formed of broken, non-continuous lines. Although FIG. 4A depicts a uniform wave pattern across the posterior surface of fabric layer 102, the pattern may change in, e.g., spacing, shape, or size, across the surface. Further, although waves are depicted in FIG. 4A, zigzags or other shaped lines may be used. In some aspects, the wave pattern may radiate out from a central location of the fabric layer 102.

Another exemplary pattern for adhesive layer 104 is a plurality of dots or discrete shapes of adhesive. As shown in FIG. 4B, an adhesive may be applied in a plurality of discrete dots that are dispersed across the posterior surface of the adhesive garment 100. A plurality of dots of the adhesive scattered across the posterior surface of the adhesive garment 100 may provide for various areas where the adhesive is not present, such that portions of the underlying fabric layer 102 is exposed. In other aspects, the plurality of dots may represent portions of adhesive layer 104 that are relatively thicker and are raised relative to other portions of adhesive layer 104. Each dot of the plurality of dots may have a uniform size as depicted in FIG. 4B. However, in some examples, the plurality of dots may not have a uniform size and may comprise different sizes. Further, the plurality of dots may be spread uniformly across the posterior side of fabric layer 102, or may be unevenly distributed across the surface. For example, in certain areas where more strain or force may be applied during use, or may be subjected to relatively more body movement, the plurality of dots may be more densely distributed. Further, although 'dots' are described and shown, the discreet portions referred to as dots may take any shape, e.g., irregular drops, polygons, such as rectangles, or triangles, stars, hearts, crosses, 'x's, or any suitable shape. Although FIG. 4B depicts a uniform pattern of across the posterior surface of fabric layer 102, the pattern may change in, e.g., spacing, shape, or size, across the surface. In some aspects, the size of the pattern may change across the surface of fabric layer 102, e.g., the dots may be smaller or larger, thicker or thinner, in different areas, e.g., where more strain or force may be applied during use, or may be subjected to relatively more body movement.

FIG. 4C depicts adhesive layer 104 comprising parallel lines of adhesive that extend across the posterior surface of adhesive garment 100. The lines may extend in a horizontal direction (as shown in FIG. 4C), in a vertical direction, in a diagonal direction, or a combination of one or more directions. Each line of adhesive may be evenly spaced apart as shown in FIG. 4C. Alternatively, the spacing between the parallel lines may be varied. Portions of fabric layer 102 may be exposed in the spacing between the parallel lines, or may be present in a thinner or thicker amount compared to adjacent areas. Although solid, continuous waves are shown in FIG. 4C, the line pattern may be formed of broken, non-continuous lines. Although FIG. 4C depicts a uniform pattern of across the posterior surface of fabric layer 102, the pattern may change in, e.g., spacing, shape, or size, across the surface.

Yet another exemplary pattern for adhesive layer 104 may be a crisscross or "X" shape of the adhesive across the posterior surface of the adhesive garment 100 as shown in FIG. 4D. As shown in FIG. 4D, a first line of adhesive and a second line of adhesive may each extend across the back surface of the adhesive garment 100 and cross each other. The adhesive may only be present along the lines. In other aspects, the adhesive layer 104 may form a crisscross pattern in which the adhesive is absent along the lines. Although only one "X" shape is depicted in FIG. 4D, a grid or cross hashing pattern may form a plurality of "X" shapes on the posterior surface of fabric layer 102. If the pattern is formed where adhesive is absent of present in a relatively thinner amount, then air may flow along the cross-hatch patterns. If the pattern is formed where adhesive is present, e.g., then the lines of adhesive may stop before intersecting another line of adhesive. Although solid, continuous lines are shown in FIG. 4A, the pattern may be formed of broken, non-continuous lines. Although FIG. 4C depicts a uniform pattern of across the posterior surface of fabric layer 102, the pattern may change in, e.g., spacing, shape, or size, across the surface.

In each of the patterns described above with respect to FIGS. 4A, 4B, 4C, and 4D, the spacing, i.e., passageways, provided by the various patterns of adhesive layer 104 where there is an absence of the adhesive on the underlying surface of fabric layer 102, may allow for the flow of air and/or moisture between the skin and adhesive garment when the adhesive garment is in contact with the skin of a user. In some embodiments herein, where the adhesive extends from a first edge of the adhesive garment 100 to a second edge of the adhesive garment 100, such that multiple rows or passageways in between the adhesive are formed, the passageways may allow for air flow and moisture evaporation due to the communication of the pattern with the edges of the adhesive garment 100 (FIGS. 4A and 4C). FIG. 4B depicts an exemplary pattern including spacing between the plurality of discrete dots, allowing for airflow and moisture evaporation around the dots. Referring to FIG. 4D, air can flow from the outer edges of adhesive garment 100 and towards the central region of adhesive garment 100, which is a portion of the adhesive garment that is adhered to the skin. This design may allow for more air to reach the skin and allow increased evaporation of any moisture on the skin. In other aspects, the design may allow moisture or sweat that forms between the skin of the wearer and the adhesive garment 100 to accumulate within the spacing where the adhesive 104 is absent or is thinner, rather than interfering with the adhesion of the garment 100 to the wearer. In some aspects, the accumulated sweat or moisture may flow out from under the adhesive garment 100 via the edges of the adhesive garment 100 to inhibit the moisture or sweat from interfering with the adhesion of the garment 100 to the wearer. While FIGS. 4A-4D show patterns for adhesive layer 104 where the adhesive pattern is either dispersed or extends across the entire posterior surface of the adhesive garment 100, in some examples, the adhesive pattern may only be applied in certain areas on the back surface of the adhesive garment 100. For example, a pattern such as a plurality of discrete dots of the adhesive may only be applied around the outer perimeter of the adhesive garment 100 and optionally near the central portion.

The patterns of adhesive layer 104 are not limited to the patterns shown in FIGS. 4A-4D. Adhesive layers of the present disclosure may have any pattern that allows for both adequate adhesion to the skin surface and flow of air and/or moisture. Other patterns may include, e.g., a plurality of lines, waves, zigzags, or other shapes radiating out from a central region of the posterior surface of fabric layer 102. Other patterns may include, e.g., a plurality of polygons, e.g., hexagons, forming a honeycomb pattern. In some embodiments, the thickness of the adhesive may vary across the pattern for adhesive layer 104. While FIGS. 4A-4D depict patterns of adhesive layer 104 that provide for spacing between locations of the adhesive such that the underlying fabric layer 102 is exposed between the spacing, adhesive layer 104 may be applied as a full coating across the entire back surface of the adhesive garment 100. In embodiments where a full coating of the adhesive is applied, adhesive layer 104 may cover the entire surface of the underlying fabric layer 102.

The exemplary patterns depicted in FIGS. 4A-4B may not be drawn to scale, and the patterns may be more or less concentrated on adhesive garment 100.

Figure 5:
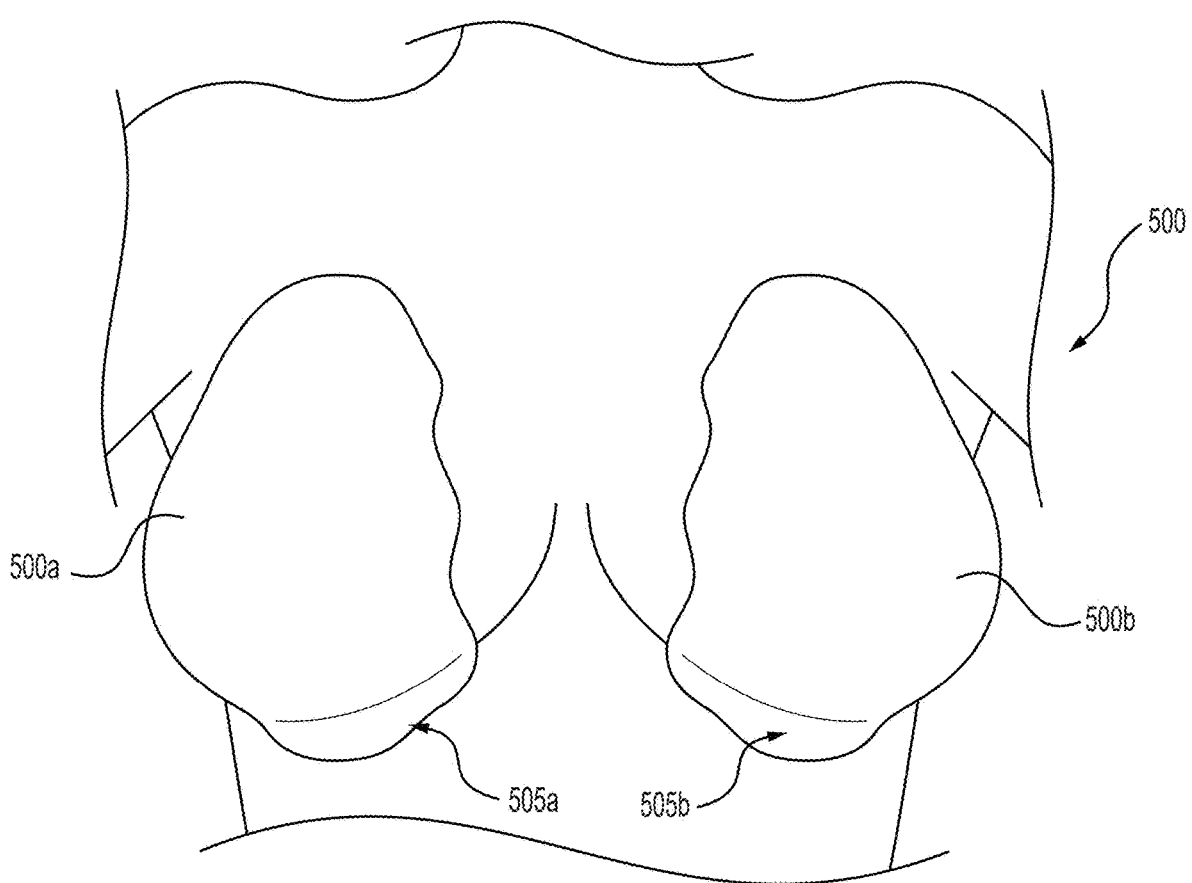
FIG. 5 illustrates an exemplary adhesive garment set of FIG. 1B on a user.

FIG. 5 depicts an exemplary adhesive garment set 500 applied to the breasts of a user. Adhesive garment 500a is applied to a first breast and adhesive garment 500b is applied to a second breast of the user. As shown in FIG. 5, adhesive garment 500a, 500b may each have a pre-cut shape that is sized to extend beyond the breast. For example, each of adhesive garment 500a and adhesive garment 500b may include a lift portion 505a, 505b of the adhesive garment that may fit underneath the breast of the user to provide a desired support and lift to the breast. Lift portion 505a, 505b of the adhesive garment 500a, 500b shown underneath the breast may provide for a cupping and scooping mechanism that lifts and supports the breast. Lift portion 505a, 505b of the adhesive garment 500a, 500b may be first applied underneath the breast, i.e., lift portion 505a, 505b of adhesive layer 104 is applied directly to the skin underneath the breast. Lift portion 505a, 505b of adhesive garment 500a, 505b may cradle the lower portion of the breast, and an upper portion 510a, 510b of adhesive garment 500a, 500b may be pulled or stretched to lift the breast upward. When the desired support, lift, and/or coverage is obtained, any remaining portions of adhesive garment 500a, 500b may be applied to and pressed onto the breast area, as well as any surrounding areas so that adhesive garment 500a, 500b adheres to the skin.

Although not depicted in FIG. 5, adhesive garment 500a, 500b may also have a portion that extends outward from the side of a breast toward the underarm area. This may allow for the outer sides of each breast to be supported and scooped inward to create a rounded appearance of the breast. While the adhesive garments disclosed herein are suitable for all breast sizes and shapes, adhesive garment set 500 depicted in FIG. 5, which includes extra portions, e.g., a lift portion, may be especially suitable for larger and/or fuller breasts.

FIG. 6 depicts another exemplary adhesive garment set 200. Adhesive garment set 200 may include a pair of adhesive garments 200a, 200b. Adhesive garment set 200 may be characterized by the same features (e.g., fabric material(s), adhesive composition, liner material, and configuration) and properties as those described for adhesive garment 100 and/or adhesive garment set 101. For example, adhesive garment 200a may be applied to a first breast, while adhesive garment 200b may be applied to a second breast. Adhesive garment 200a and adhesive garment 200b may each have a teardrop or pear shape. The widened lower portion of the teardrop shape may provide for a cupping and scooping mechanism that lifts and supports the breast, while the narrower upper portion may adhere to the chest so as to suspend the lifted breast. While not shown, adhesive garment 200a, 200b may have a fabric layer 202 (e.g., a first layer 202) and an adhesive layer 204 (e.g., a second layer 204) adjacent to a surface of fabric layer 202 (FIG. 7A).

FIGS. 7A and 7B show exemplary patterns for adhesive layer 204. Adhesive layer 204 may have a pattern that provides for spacing between locations of the adhesive such that the underlying fabric layer 202 is exposed between the spacing, which may allow for the flow of air and/or moisture, as discussed above. Adhesive layer 204 may have a pattern that is the same or different from the patterns described herein with respect to adhesive layer 104 and shown in FIGS. 4A-4D. For example, FIG. 7A shows a wave pattern for adhesive layer 204, where a plurality of waves of adhesive span the posterior surface of the adhesive garment 200a, where there is spacing between the waves. FIG. 7B depicts adhesive layer 204 comprising vertical parallel lines of adhesive that extend across the posterior surface of adhesive garment 200a. The pattern shown for adhesive layer 204 in FIG. 7B may provide the same properties as the pattern shown for adhesive layer 104 in FIG. 4C.

Figure 8:
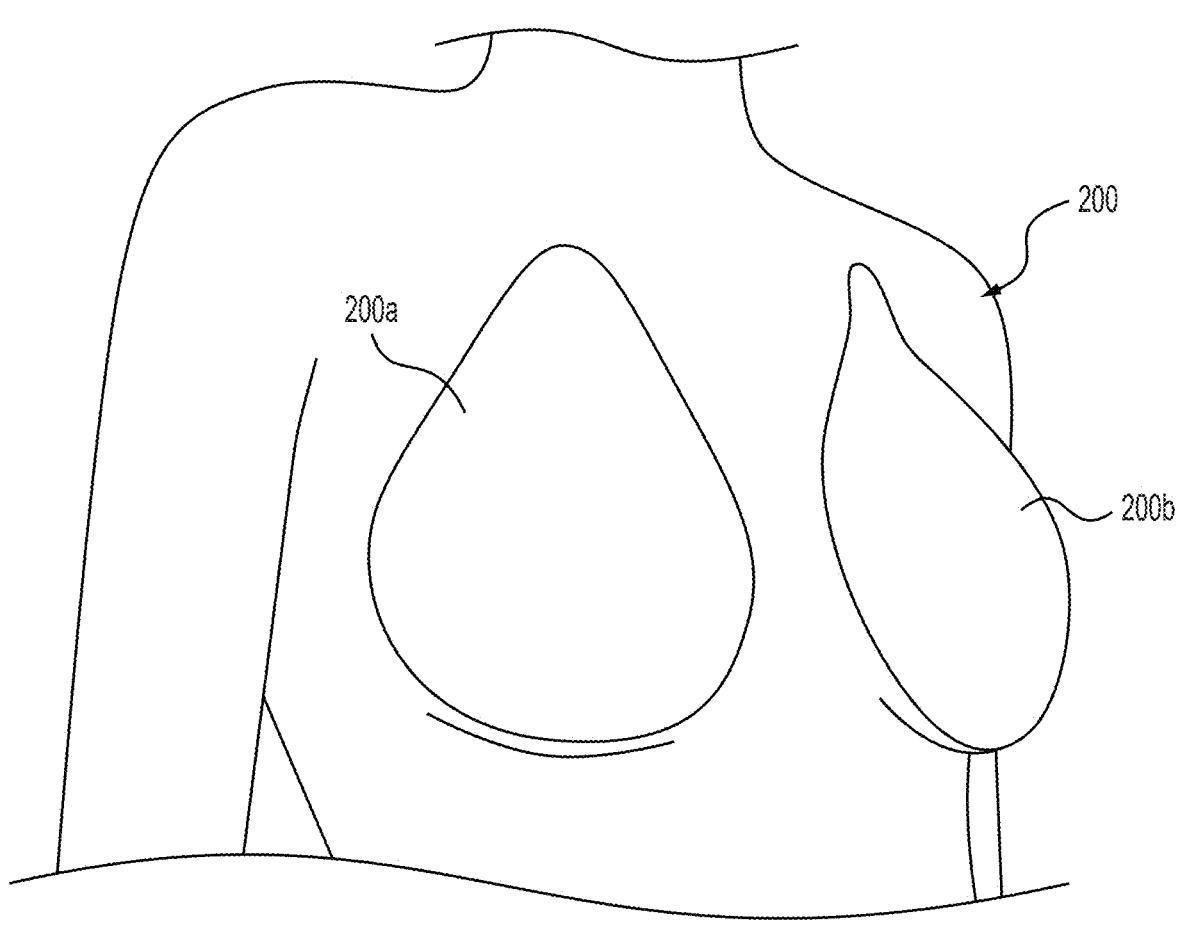
FIG. 8 illustrates an exemplary adhesive garment set of FIG. 6 on a user.

FIG. 8 depicts the adhesive garment set 200 of FIG. 6 applied to the breasts of a user. Adhesive garment 200a is applied to a first breast and adhesive garment 200b is applied to a second breast of the user. The pear shape of adhesive garment 200a, 200b may allow adhesive garment 200a, 200b to cover a substantial portion of a user's breast. Adhesive garment 200a, 200b may also provide lift and support to a breast. For example, a bottom portion of adhesive garment 200a, 200b, which corresponds to the wider end of adhesive garment 200a, 200b, opposite the narrowed end, may be first applied to the breast. In particular, a bottom portion of adhesive garment 200a, 200b may be first applied to a lower portion of the breast, such as an area of the breast that is proximal to the area underneath the breast. The upper, narrowed portion of adhesive garment 200a, 200b may be pulled or stretched to lift the breast upward. Applying the upper, narrowed portion of adhesive garment 200a, 200b to the skin after the desired lift has been achieved may maintain the lift of the breast. As shown in FIG. 8, the pear shape of adhesive garment 200a, 200b may extend outward to cover the sides of the breast. This may allow for the outer sides of each breast to be supported and scooped inward. While the adhesive garments disclosed herein are suitable for all breast sizes and shapes, adhesive garment set 200 depicted in FIG. 8, may be especially suitable for medium sized breasts.

Figure 9:
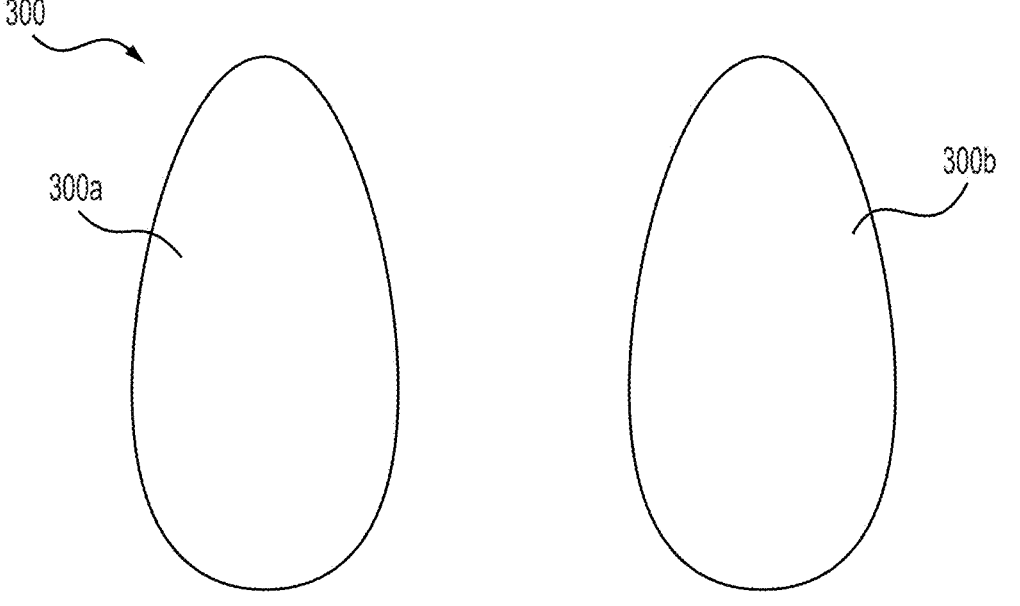
FIG. 9 illustrates an exemplary adhesive garment set according to one or more embodiments of the disclosure.

FIG. 9 depicts another exemplary adhesive garment set 300. The adhesive garment set of FIG. 9 includes a pair of adhesive garments 300a, 300b. Adhesive garment set 300 may be characterized by the same features (e.g., fabric material(s), adhesive composition, liner material, and configuration) and properties as those described for adhesive garment sets 101 and 200. For example, adhesive garment 300a may be applied to a first breast, while adhesive garment 300b may be applied to a second breast. Adhesive garment 300a and adhesive garment 300b each have an ovular or egg-like shape. While not shown, adhesive garment 300 may have a fabric layer 302 (e.g., a first layer 302) and an adhesive layer 304 (e.g., a second layer 304) adjacent to a surface of fabric layer 302.

Figure 10:
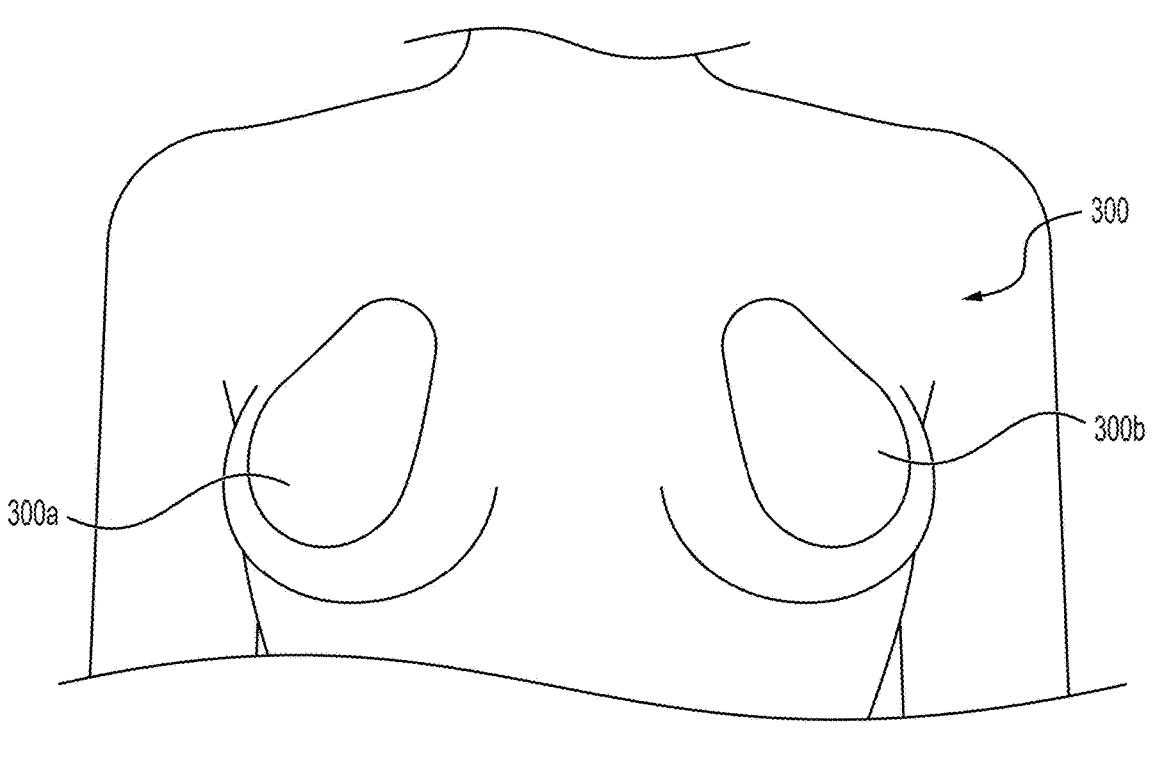
FIG. 10 illustrates an exemplary adhesive garment set of FIG. 9 on a user.

FIG. 10 shows the adhesive garment set 300 of FIG. 9 comprising a pair of adhesive garment 300a, 300b applied to the breasts of a user. Adhesive garment 300a is applied to a first breast and adhesive garment 300b is applied to a second breast of the user. The ovular shape of adhesive garment 300a, 300b may allow the adhesive garment 300a, 300b to cover a portion of a user's breast. For example, adhesive garment 300a, 300b may be applied directly to the area of the breast including and surrounding the nipple. In some examples, a bottom portion of adhesive garment 300a, 300b, which corresponds to the slightly wider end of adhesive garment 300a, 300b, opposite the narrowed end, may be first applied to a middle portion of the breast, closest to the nipple area. The bottom portion of adhesive garment 300a, 300b, may be positioned against the breast, so that the adhesive garment 300a, 300b, tilts inward toward the center of the chest. The upper, narrowed portion of adhesive garment 300a, 300b may be pulled or stretched to slightly lift the breast and/or pull the breast inward. As shown in FIG. 9, adhesive garment 300a, 300b may not cover the sides and/or a lower portion of a breast. The adhesive garment set comprising adhesive garment 300a and adhesive garment 300b may be worn when a user desires less coverage, support, and/or lift of the breasts, or when wearing more revealing clothing. While the adhesive garments disclosed herein are suitable for all breast sizes and shapes, adhesive garment set 300 depicted in FIG. 9, may be especially suitable for smaller-sized breasts.

Figure 11:
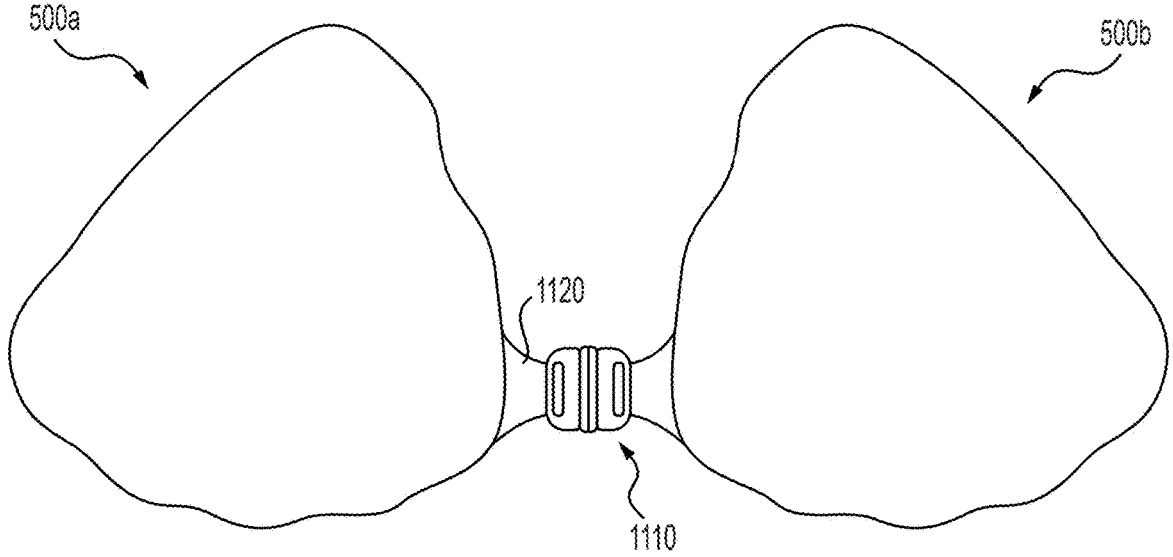
FIG. 11 illustrates an exemplary adhesive garment connector system according to one or more embodiments of the disclosure.

Adhesive garments of the present disclosure may also be configured to provide a desired look and fit for the breasts. FIG. 11 shows how a connector system 1120 may be used to connect a first adhesive garment and a second adhesive garment that are applied separately to each breast of a user. An adhesive garment system of the present disclosure, such as the adhesive garment system shown in FIG. 1B, may include a pair of separate adhesive garments for applying to each breast one at a time. FIGS. 5, 8, and 10 show how the adhesive garments may remain separate and distinct when applied to each breast. For example, in FIG. 5, adhesive garment 500a does not connect with adhesive garment 500b and the respective breasts are shown spaced apart. The connector system 1120 may be used to connect adhesive garment 100a and adhesive garment 100b as shown in FIG. 11. Connecting adhesive garment 100a and adhesive 100b with the connector system 1120 may have the effect of bringing each breast inward and closer together to provide for cleavage.

The connector system 1120 may include a connector element 1110, such as a clasp, hook and loop, or other suitable fastener, which may provide a fixed connection between a first part of the connector system 1120 attached to a first adhesive garment and a second part of the connector system 1120 attached to a second adhesive garment. In some examples, the first part of the connector system 1120 and the second part of the connector system 1120 may be separate components that may connect to each other via the connector element 1110 at one end and attach to an adhesive garment at the other end. Opposite ends of the connector system 1120 may be configured to attach to the inward facing sides of adhesive garment 100a and adhesive garment 100b. In some examples, the ends of the connector system 1120 may be configured to stick to adhesive layer 104 of each adhesive garment 100. In other examples, the ends of the connector system 1120 may be configured to clip onto each adhesive garment 100. The connector element 1110 may also be adjustable, which may allow for the amount of cleavage to be adjusted when adhesive garment 100*a* and adhesive garment 100*b* are connected via the connector system 1120. Other mechanisms for connecting separate adhesive garments and adjusting the spacing between the breasts, such as a drawstring mechanism, may also be used with adhesive garment sets of the present disclosure.

Figures 12A, 12B:
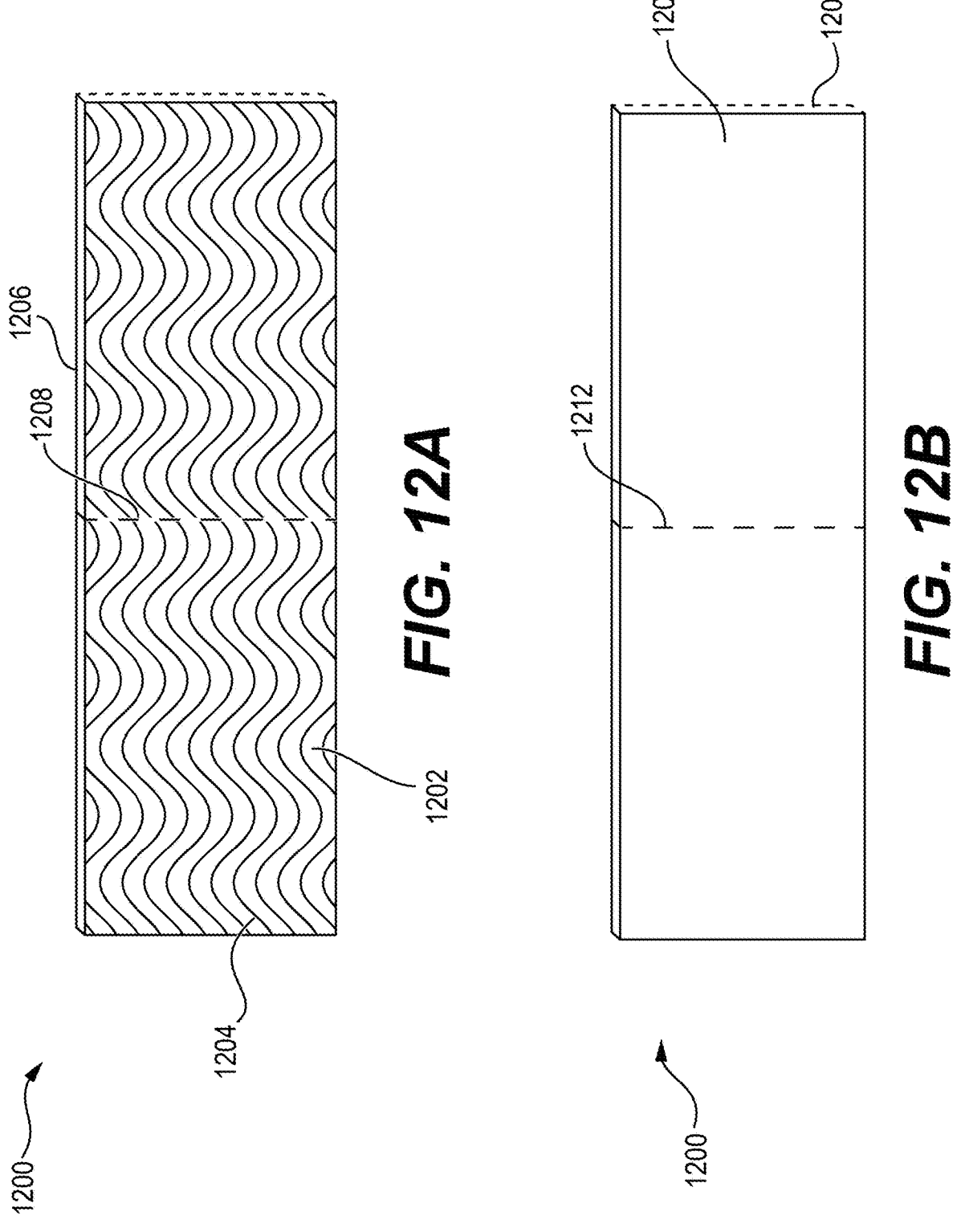
FIGS. 12A-B illustrate an exemplary adhesive garment according to one or more embodiments of the disclosure.

In some aspects, adhesive garments of the present disclosure may be customizable. FIGS. 12A-B illustrate an exemplary customizable adhesive garment 1200 according to one or more embodiments of the disclosure. FIG. 12A illustrates an exemplary posterior surface of adhesive garment 1200 showing adhesive layer 1204, and FIG. 12B illustrates an exemplary posterior surface of adhesive garment 1200 when covered by a liner 1206. Adhesive garment 1200 may be characterized by the same features (e.g., fabric material(s), adhesive composition, liner material, configuration, etc.) and properties as those described for adhesive garments 100, 200 and/or adhesive garment sets 101, 200, 300, 500.

As depicted in FIG. 12A, adhesive garment 1200 may have a fabric layer 1202 (e.g., a first layer 1202), an optional liner layer 1206 (e.g., a third layer 1206), and an adhesive layer 1204 (e.g., a second layer 1204) applied to a surface of fabric layer 1202 and between fabric layer 1202 and the optional liner layer 1206, if used. First layer 1202 may correspond to a first surface of adhesive garment 1200. First layer 1202 may be made from a material as discussed herein.

Second layer 1204 may correspond to a second surface of adhesive garment 1200. Second layer 1204 may be made from a material as discussed herein. While FIG. 12A depicts a continuous wave pattern, second layer 1204 may include any of the patterns discussed herein, such as a non-continuous wave pattern, a zigzag pattern, a dotted pattern, a parallel lines pattern, a crisscross pattern, an "X" pattern, etc.

Third layer 1206 may serve as a covering for second layer 1204, if included. Third layer 1206 may be applied to second layer 1204 as discussed herein (e.g., as discussed in relation to FIG. 2). Referring to FIG. 12B, third layer 1206 may or may not include one or more partitioning lines 1212 that may divide liner layer 1206 into separable components, which may each be separately removed from adhesive layer 1204 as described herein in multiple pieces.

As discussed in further detail below, in some aspects, a perforation 1208 may extend through first layer 1202, second layer 1204, and third layer 1206, if included, so that when a section of adhesive garment 1200 is removed from the remainder of adhesive garment 1200 at perforation 1208, a first component of liner layer 1206, if included, may also be removed.

Adhesive garment 1200 may be pre-cut into a desired size or shape. For example, adhesive garment 1200 may have a substantially rectangular shape as shown in FIGS. 12A-B. For example, adhesive garment 1200 may be stored on a spool, rolled up, etc., or in a flat strip or sheet. Other suitable shapes include, but are not limited to, ovals, "teardrop" shapes, ellipses, triangles, diamonds, squares, rectangles, semi-circles, and pear shapes, and these pre-cut shapes may be stored as a strip of pre-cut shapes, on a sheet of pre-cut shapes, or as a roll of pre-cut shapes. In some examples, adhesive garment 1200 may have an irregular shape. The pre-cut shapes may be individual shapes arranged next to one another on a backing or liner, or may be pre-cut shapes that include perforations from which the pre-cut shapes may be separated from other pre-cut shapes, or separated from a continuous sheet, strip, or roll of pre-cut shapes. During use, a user may perforate at perforation 1208 and remove a pre-cut portion of the garment 1200 to use. Once removed, the garment 1200 may be applied to or around a breast of a user in a desired pattern.

In other aspects, the shapes may not be pre-cut, and a user may be able to cut a sheet, roll, or strip of adhesive garment 1200 to remove a desired amount of adhesive garment 1200 for use. Once removed, the garment 1200 may be applied to or around a breast of a user in a desired pattern.

The present disclosure may also include a kit. A kit may include at least one adhesive garment set as described herein, comprising an adhesive garment for each of a first breast and a second breast. The kit may further include at least one of a plurality of replacement liners for the adhesive layer of each adhesive garment and/or a connector system for connecting a pair of adhesive garments. In at least one example, a kit may also include user instructions. In some embodiments, a kit may include multiple adhesive garment sets, each comprising an adhesive garment for a first breast and a second breast. For example, a kit may include two or more (e.g., three, four, five etc.) adhesive garment sets according to the present disclosure. Each adhesive garment set in the kit may have different properties. For example, each adhesive garment set may be made from a different fabric, have a different adhesive layer pattern, have a different adhesive composition, have a different fabric color, and/or have a different shape for each pair of the adhesive garments. Such kits may allow a user to select different adhesive garment sets based on the style of the outer garment, the conditions under which the adhesive garments will be worn (e.g., conditions that cause excessive sweating), as well as the desired coverage, support and/or lift provided for the breasts.

The characteristics and properties of an adhesive garment of the present disclosure may allow the adhesive garment to provide desired coverage, support, and lift to a variety of breast shape and sizes, including larger, fuller, and/or heavier breasts. For example, various properties including, but not limited to, the composition of the adhesive layer and the patterning of the adhesive layer may contribute to providing one or more of the following benefits with respect to the adhesive garment: 1) a limited amount to no amount of skin irritation; 2) extended wear; 3) reusability; 4) breathability; 5) stretchability and conformance; 6) ease of application and removal; and 7) limited to no pain or skin damage upon removal.

Adhesive garments of the present disclosure may be manufactured from fabric, such as a fabric described herein. The fabric may be laminated with an adhesive (e.g., silicone or TPE adhesive), combined with a liner of release paper, and then cut into intervals. Next, the combined fabric, adhesive, and liner may be cut using a mold of a shape, such as a shape corresponding to the shape shown in FIGS. 1A-1B and 4A-11. In some examples, a silicone or TPE adhesive may be applied to the fabric in a liquid brush-on format. In other examples, a silicone or TPE adhesive may be applied to the fabric as a gel in tape format.

The description above and examples are illustrative, and are not intended to be restrictive. One of ordinary skill in the art may make numerous modifications and/or changes without departing from the general scope of the invention. For example, and as has been referenced, the above-described embodiments (and/or aspects thereof) may be used in combination with each other. Additionally, portions of the above-described embodiments may be removed without departing from the scope of the invention. In addition, modifications may be made to adapt a particular situation or aspect to the teachings of the various embodiments without departing from their scope. Many other embodiments will also be apparent to those of skill in the art upon reviewing the above description. The present disclosure is not limited to the exemplary shapes, sizes, and/or materials discussed herein. A person of ordinary skill in the art will recognize that additional shapes, sizes, and/or materials may be used as discussed herein to achieve the same or similar effects or benefits as discussed above. Moreover, the features of any embodiment may be used in conjunction with any of the other disclosed embodiments.

What is claimed is:

1. An adhesive garment for application to a skin surface of a user, the adhesive garment comprising:
   a stretchable material including an anterior surface and a posterior surface, wherein the stretchable material has an elasticity ranging from about 120% to about 220%,
   an adhesive, wherein the adhesive is formed of a silicone or a thermoplastic elastomer (TPE), and wherein the adhesive is applied to a portion of the posterior surface of the stretchable material, and
   a liner, wherein the liner is attached to a portion of a surface of the adhesive opposite from the stretchable material.

2. The adhesive garment of claim 1, wherein the stretchable material includes at least one of polyester, cotton, nylon, hemp, or combinations thereof.

3. The adhesive garment of claim 1, wherein the stretchable material is a four-way stretchable material.

4. The adhesive garment of claim 1, wherein the adhesive does not comprise acrylic.

5. The adhesive garment of claim 1, wherein the adhesive is applied in a pattern of discrete shapes configured to promote air flow between the adhesive garment and the skin surface of the user during use.

6. The adhesive garment of claim 1, wherein the adhesive is applied in a wavelike, hexagonal, or linear pattern to the posterior surface of the stretchable material.

7. The adhesive garment of claim 1, wherein the adhesive is applied in a pattern such that a first portion of the adhesive garment has a first tack level and a second portion of the adhesive garment has a second tack level, the first tack level being less than the second tack level.

8. The adhesive garment of claim 1, wherein the adhesive is substantially free of solvents or hardeners.

9. The adhesive garment of claim 1, wherein the adhesive comprises silicone, and the silicone adhesive comprises crosslinked silicone.

10. The adhesive garment of claim 1, wherein the adhesive comprises TPE, and the TPE comprises rubber and a hydrocarbon.

11. The adhesive garment of claim 10, wherein the TPE comprises at least one of hydrogenated hydrocarbon resin and mineral oil saturated hydrocarbon.

12. An adhesive garment for application to a breast area of a user, the adhesive garment comprising:
   a first layer having an anterior surface and a posterior surface, wherein the first layer includes a lift portion, wherein the lift portion is configured to support a portion of the breast area during use, and
   a second layer including a thermoplastic elastomer (TPE) adhesive, wherein the TPE adhesive is applied to the posterior surface of the first layer.

13. The adhesive garment of claim 12, wherein the TPE adhesive is applied in a pattern of discrete shapes configured to promote air flow between the adhesive garment and the user's breast area during use.

14. The adhesive garment of claim 13, wherein the pattern extends to an edge of the adhesive garment.

15. The adhesive garment of claim 12, wherein the lift portion is configured to support a lower portion of the breast and to adhere to an area underneath the breast during use.

16. The adhesive garment of claim 12, wherein the first layer includes a winged outer portion configured to wrap around a side of the breast during use.

17. An adhesive garment set comprising:
   a first adhesive garment; and
   a second adhesive garment;
   wherein each of the first adhesive garment and the second adhesive garment include a first layer of breathable material and a second layer of thermoplastic elastomer (TPE) adhesive applied to a posterior surface of the first layer.

18. The adhesive garment set of claim 17, wherein the adhesive is applied in a pattern of discrete shapes that provides spacing between portions of the TPE adhesive to allow for air flow in the spacing between the portions of the TPE adhesive.

19. The adhesive garment set of claim 7, wherein the pattern is a wavelike, hexagonal, or linear pattern.

20. An adhesive garment for application to a skin surface of a user, the adhesive garment comprising:
   a stretchable material including an anterior surface and a posterior surface,
   an adhesive, wherein the adhesive is formed of a thermoplastic elastomer (TPE), and wherein the adhesive is applied to a portion of the posterior surface of the stretchable material, and
   a liner, wherein the liner is attached to a portion of a surface of the adhesive opposite from the stretchable material.

* * * * *